(12) United States Patent
Farrugia

(10) Patent No.: US 12,043,755 B2
(45) Date of Patent: Jul. 23, 2024

(54) COMPOSITIONS, METHODS, AND ARTICLES RELATING TO IN-SITU CROSSLINKING OF POLYAMIDES DURING ADDITIVE MANUFACTURING

(71) Applicant: Xerox Corporation, Norwalk, CT (US)

(72) Inventor: Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 279 days.

(21) Appl. No.: 17/104,365

(22) Filed: Nov. 25, 2020

(65) Prior Publication Data

US 2022/0162474 A1    May 26, 2022

(51) Int. Cl.
*C09D 177/06*        (2006.01)

(52) U.S. Cl.
CPC ................... *C09D 177/06* (2013.01)

(58) Field of Classification Search
None
See application file for complete search history.

(56) References Cited

U.S. PATENT DOCUMENTS

| | | | | |
|---|---|---|---|---|
| 3,489,701 A * | 1/1970 | Ki | ........................ | C08G 14/14 |
| | | | | 525/428 |
| 2005/0159579 A1 * | 7/2005 | Winterling | ............. | C08G 69/48 |
| | | | | 528/310 |

FOREIGN PATENT DOCUMENTS

| | | | |
|---|---|---|---|
| CA | 3055862 A1 | * | 9/2018 |
| CA | 3035939 A1 | * | 9/2019 |
| CN | 104194326 A | | 12/2014 |
| EP | 3064555 A1 | * | 9/2016 |
| EP | 3510101 A1 | | 7/2019 |
| EP | 3789421 A1 | | 3/2021 |
| FR | 3019825 A1 | * | 10/2015 |
| JP | 4101399 B2 | * | 8/2008 |
| JP | 2010229170 A | * | 10/2010 |
| WO | WO 98/54399 | * | 12/1993 |

OTHER PUBLICATIONS 2-page brochure for Nylon 12 by Microspec Corporation, Downloaded on Sep. 19, 2023.*
Extended EP Search Report Dated Apr. 20, 2022.

* cited by examiner

*Primary Examiner* — Tae H Yoon
(74) *Attorney, Agent, or Firm* — Vorys, Sater, Seymour and Pease LLP

(57) ABSTRACT

Particles may be produced that comprise an unsaturated polyamide and an initiator. Said particles may be used in additive manufacturing methods that comprise: depositing the particles optionally in combination with other thermoplastic polymer particles upon a surface; and once deposited, heating at least a portion of the particles to promote consolidation thereof and crosslinking of the unsaturated polyamide, thereby forming a consolidated body comprising a crosslinked polyamide.

20 Claims, 1 Drawing Sheet

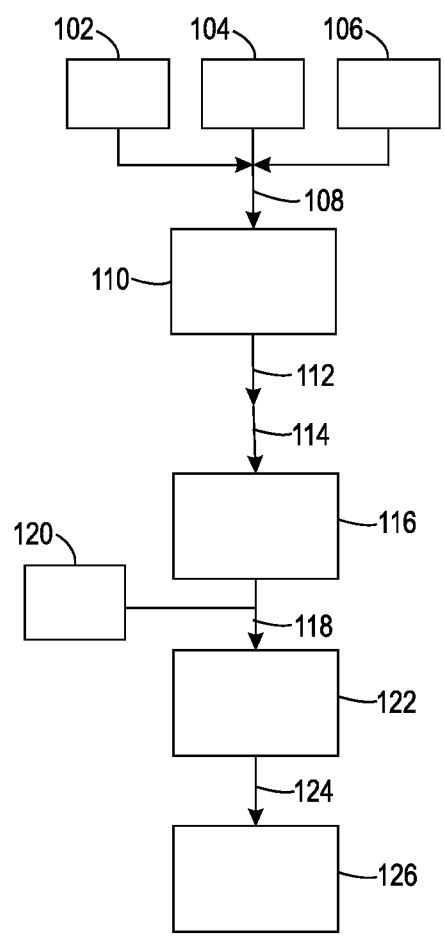

COMPOSITIONS, METHODS, AND ARTICLES RELATING TO IN-SITU CROSSLINKING OF POLYAMIDES DURING ADDITIVE MANUFACTURING

TECHNICAL FIELD

The present disclosure includes compositions, synthesis methods, and articles that relate to polyamides that are crosslinked during additive manufacturing processes.

BACKGROUND

Thermoplastic polymers are often used to make extruded objects like films, bags, particles, and filaments. One example of a thermoplastic polymer is a polyamide. Polyamides like nylons are off-white colored polymers that have the ability to withstand elevated or low temperatures without loss of physical properties. Therefore, objects formed with polyamides can be used in demanding applications like power tools, automotive parts, gears, and appliance parts. Additive manufacturing is increasingly used to produce such objects.

Generally, additive manufacturing broadly describes technology that build 3-dimensional objects by adding layer-upon-layer of material. The addition of layers can be achieved using filaments or powders. For filaments, the material of the filament is melted, extruded, and deposited in layers to produce the desired object. Such methods may be referred to as fused filament fabrication (FFF). Selective laser sintering (SLS) is another additive manufacturing method where a thin layer of powder (typically microparticles) are applied as a layer. Select areas within this layer are fused by exposure to a laser beam (e.g., a $CO_2$ laser beam) to build a solid object that is supported by unused powder.

Polyamide is one of the most common polymers used in additive manufacturing because of its flow properties, lower cost than other polymers, and desirable sintering window. However, physical properties needed in objects produced by additive manufacturing may be beyond those of a polyamide.

SUMMARY OF INVENTION

The present disclosure includes compositions, synthesis methods, and articles that relate to polyamides that are crosslinked during additive manufacturing processes. That is, the compositions and methods described herein allow for in situ crosslinking of the polyamide during the consolidation step of additive manufacturing.

Disclosed herein are compositions that comprise: particles comprising an unsaturated polyamide and an initiator.

Disclosed herein are methods that comprise: depositing the foregoing composition optionally in combination with other thermoplastic polymer particles upon a surface; and once deposited, heating at least a portion of the particles to promote consolidation thereof and crosslinking of the unsaturated polyamide, thereby forming a consolidated body comprising a crosslinked polyamide.

Disclosed herein are methods that comprise: mixing a mixture comprising an unsaturated polyamide, a carrier fluid that is immiscible with the unsaturated polyamide, and optionally an emulsion stabilizer at a temperature greater than a melting point or softening temperature of the unsaturated polyamide and at a shear rate sufficiently high to disperse the unsaturated polyamide in the carrier fluid; and cooling the mixture to below the melting point or softening temperature of the unsaturated polyamide to form unsaturated polyamide particles comprising the unsaturated polyamide and the emulsion stabilizer, when present, associated with an outer surface of the unsaturated polyamide particles.

BRIEF DESCRIPTION OF THE DRAWINGS

The following FIGURE are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

The FIGURE is a flow chart of a nonlimiting example method of the present disclosure.

DETAILED DESCRIPTION

The present disclosure includes compositions, synthesis methods, and articles that relate to polyamides that are crosslinked during additive manufacturing processes. More specifically, the polyamide syntheses described herein use one or more polyamide monomers having at least one unsaturated, aliphatic carbon-carbon bond. The resulting polyamide, referred to herein as an unsaturated polyamide, contains unsaturated, aliphatic carbon-carbon bonds.

The present disclosure also relates to particles comprising the unsaturated polyamide and related methods. Said particles are referred to herein as unsaturated polyamide particles. The unsaturated polyamide particles may be doped with an initiator. The methods of preparing the unsaturated polyamide particles doped with an initiator and using the unsaturated polyamide particles doped with an initiator in additive manufacturing are described herein. During additive manufacturing, and more specifically during consolidating, the initiator may cause crosslinking between the unsaturated polyamides. The crosslinking of the polyamides may impart higher heat resistance, improved abrasion resistance, and improve other physical properties as compared to the polyamides if not crosslinked. Accordingly, said improved properties may be imparted on articles and objects produced by additive manufacturing methods.

Further, in additive manufacturing methods, working directly with highly crosslinked polyamides may be difficult because the melt flow rates are low. As such, the particles comprising highly crosslinked polyamides may not consolidate effectively, or the filaments comprising highly crosslinked polyamides have suitable melting and flow properties. Advantageously, the compositions and methods of the present disclosure use in situ crosslinking of the unsaturated polyamides. Therefore, the desirable melt and flow properties of the unsaturated polyamides may be exploited during the additive manufacturing methods to provide good consolidation of the particles while the temperatures and/or laser wavelengths encountered in additive manufacturing methods may initiate crosslinking of the unsaturated polyamides by activation of the initiators. This may allow for ample time for the unsaturated polyamides to melt and/or consolidate into the desired locations and for the crosslinks to be formed such that the resultant article or object is actually formed of a crosslinked polyamide. Accordingly, the resultant article may have the improved physical properties of the crosslinked polyamide.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "thermal initiator" refers to a molecule that creates reactive species (e.g., free radicals, cations, or anions) when exposed to heat. The temperature needed to activate thermal initiators depends on the molecule and is readily attained by reference and/or by simple experimentation by one skilled in the art.

As used herein, the term "photoinitiator" refers to a molecule that creates reactive species (e.g., free radicals, cations, or anions) when exposed to electromagnetic radiation (e.g., ultraviolet light, visible light, and the like, and any combination thereof).

As used herein, the term "initiator" refers generally to one or more thermal initiators, one or more photoinitiators, or a combination of one or more thermal initiators and one or more photoinitiators.

As used herein, the term "polyamide monomer(s)" refers to a monomer(s) that form a polyamide.

As used herein, the term "polyacid" when referring to a compound refers to a compound having two or more carboxylic acid moieties. Herein, anhydride moieties are considered carboxylic acid moieties because the anhydrides open to carboxylic acids during synthesis.

As used herein, the term "polyamine" when referring to a compound refers to a compound having two or more amine moieties.

As used herein, the term "amino acid" when referring to a compound refers to a compound having one or more carboxylic acid moieties and one or more amine moieties.

Again, anhydride moieties are considered carboxylic acid moieties because the anhydrides open to carboxylic acids during synthesis.

When referring to a polymer in terms of the -mer units (e.g., polyamide monomers), it would be understood by one skilled in the art that the -mer units are in the polymerized form in the polymer.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherence via hydrogen bonding and/or other mechanisms. However, chemical bonding may be occurring to some degree.

As used herein, the term "embed" relative to nanoparticles and a surface of a polymer particle refers to the nanoparticle being at least partially extended into the surface such that polymer is in contact with the nanoparticle to a greater degree than would occur if the nanoparticle were simply laid on the surface of the polymer particle.

As used herein, the term "dry blend" refers to mixing components each having less than 10 wt % of solvent and/or dispersant (e.g., water, methanol, acetone, and the like, and any combination) present by weight of said component.

As used herein, the term "wet blend" refers to mixing components where at least one component is in the presence of 10 wt % or greater of solvent and/or dispersant (e.g., water, methanol, acetone, and the like, and any combination) by weight of said component.

Herein, D10, D50, D90, and diameter span are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90−D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instrument software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is CEA/P, where CEA is the circumference of a circle having the area equivalent to the area (A) of the actual particle.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, the viscosity of carrier fluids is the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Unsaturated Polyamides

Unsaturated polyamides may be synthesized by a variety of methods where at least one monomer includes at least one unsaturated, aliphatic carbon-carbon bond. Examples of methods include, but are not limited to, condensation polymerization (also referred to herein as polycondensation) and ring-opening polymerization. Without being limited by theory, the synthesis methods may preferably be performed at temperatures at which the unsaturated bonds do not participate in the polymerization. While this temperature will vary based on the monomers used, preferably, unsaturated polyamides are synthesized at temperatures of 100° C. or less.

Herein, these polymerizations are performed in the presence of one or more polyamine monomers, one or more polyacid monomers, one or more amino acid monomers, or any combination thereof where at least one of any of said monomers includes at least one unsaturated, aliphatic carbon-carbon bond.

Several example polycondensation and ring-opening polymerization reactions are presented below followed by nonlimiting examples of polyamide monomers suitable for use in one or more of said reactions. The following examples are nonlimiting to the scope of polyamide monomers.

Scheme 1 illustrates a polycondensation reaction of an amino acid polyamide monomer where the C-1 represents the portion of the amino acid polyamide monomer between the carboxylic acid and amine moieties that participate in the polycondensation reaction. For the compositions and methods of the present disclosure, the C-1 in this example would include at least one unsaturated, aliphatic carbon-carbon bond. Scheme 2 is a nonlimiting example of Scheme 1.

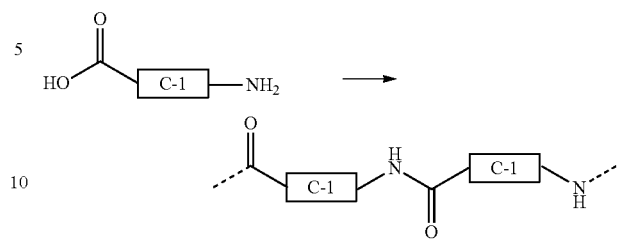

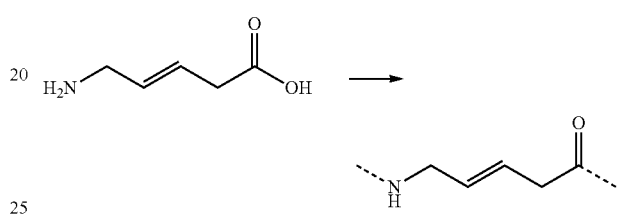

Scheme 3 illustrates a polycondensation reaction between two amino acid polyamide monomers, where the C-1 and C-2 represent the portions of their respective amino acid polyamide monomer between the carboxylic acid and amine moieties that participate in the polycondensation reaction. For the compositions and methods of the present disclosure, the C-1, C-2, or both C-1 and C-2 may include at least one unsaturated, aliphatic carbon-carbon bond.

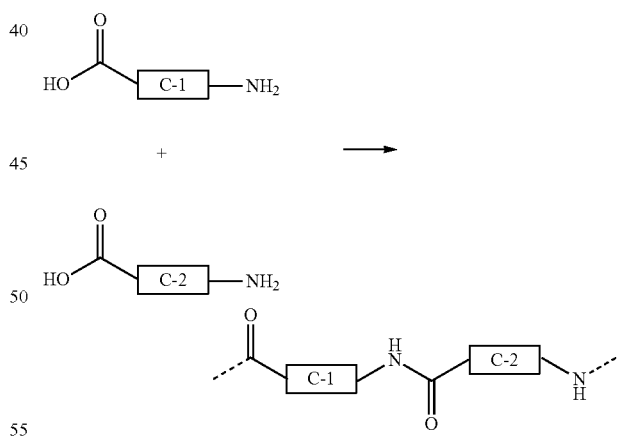

Scheme 4 is a nonlimiting example of Scheme 3 where C-1 does not include an unsaturated, aliphatic carbon-carbon bond and C-2 does include an unsaturated, aliphatic carbon-carbon bond. In instances like Scheme 4 where one polyamide monomer includes at least one unsaturated, aliphatic carbon-carbon bond and the other does not include an unsaturated, aliphatic carbon-carbon bond, the relative ratios of the two monomers may be used to control the amount of unsaturated, aliphatic carbon-carbon bonds in the resultant polyamide.

Scheme 4

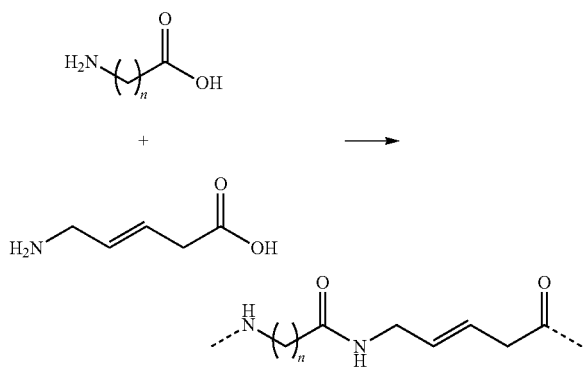

Scheme 5 illustrates a polycondensation reaction between an amino acid polyamide monomer and a polyamine polyamide monomer, where the C-1 and C-2 represent the portions of their respective polyamide monomer between the carboxylic acid and amine moieties or two amine moieties that participate in the polycondensation reaction. For the compositions and methods of the present disclosure, the C-1, C-2, or both C-1 and C-2 may include at least one unsaturated, aliphatic carbon-carbon bond.

Scheme 5

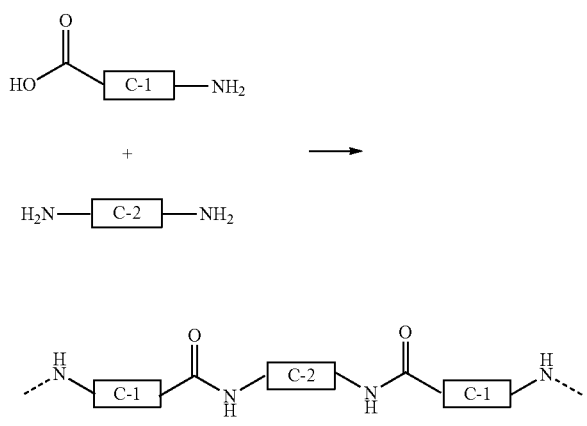

Where C-1 of Scheme 5 includes at least one unsaturated, aliphatic carbon-carbon bond, the majority of the resultant polyamide will include unsaturated, aliphatic carbon-carbon bonds. Where C-2 of Scheme 5 includes at least one unsaturated, aliphatic carbon-carbon bond and C-1 of Scheme 5 does not include an unsaturated, aliphatic carbon-carbon bond, only the unsaturated, aliphatic carbon-carbon bonds of single instance of C-2 per polymer chain may participate in future crosslinking (e.g., during consolidation in an additive manufacturing method). In such instances, the resultant polyamide has a lower crosslinking potential than some other examples herein. Scheme 6 is a nonlimiting example of Scheme 5 where C-2 includes at least one unsaturated, aliphatic carbon-carbon bond and C-1 does not include an unsaturated, aliphatic carbon-carbon bond.

Scheme 6

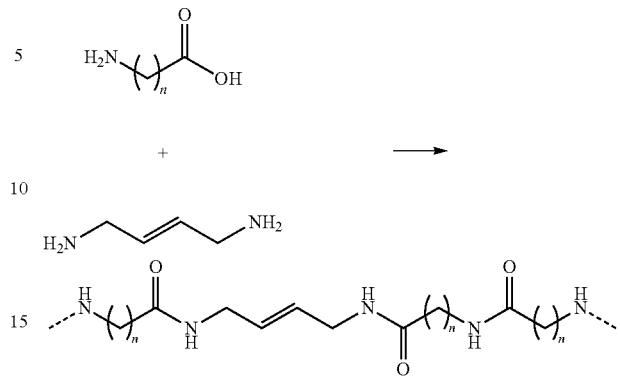

Scheme 7 illustrates a polycondensation reaction between an amino acid polyamide monomer and a polyacid polyamide monomer, where the C-1 and C-2 represent the portions of their respective polyamide monomer between the carboxylic acid and amine moieties or two carboxylic acid moieties that participate in the polycondensation reaction. For the compositions and methods of the present disclosure, the C-1, C-2, or both C-1 and C-2 may include at least one unsaturated, aliphatic carbon-carbon bond.

Scheme 7

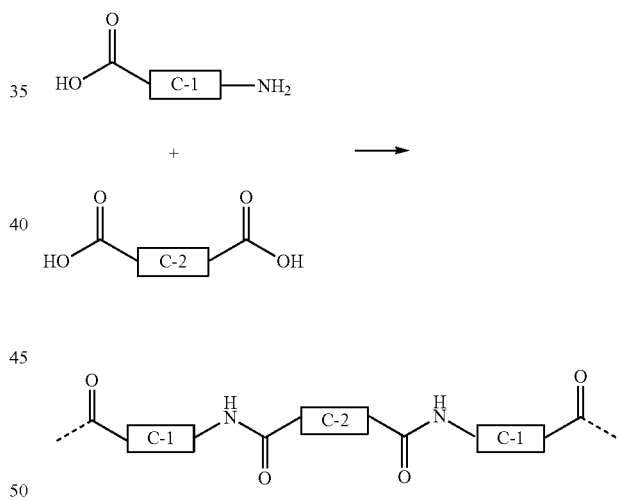

Where C-1 of Scheme 7 includes at least one unsaturated, aliphatic carbon-carbon bond, the majority of the resultant polyamide will include unsaturated, aliphatic carbon-carbon bonds. Where C-2 of Scheme 7 includes at least one unsaturated, aliphatic carbon-carbon bond and C-1 of Scheme 7 does not include an unsaturated, aliphatic carbon-carbon bond, only the unsaturated, aliphatic carbon-carbon bonds of single instance of C-2 per polymer chain may participate in future crosslinking (e.g., during consolidation in an additive manufacturing method). In such instances, the resultant polyamide has a lower crosslinking potential than some other examples herein. Scheme 8 is a nonlimiting example of Scheme 7 where C-2 includes at least one unsaturated, aliphatic carbon-carbon bond and C-1 does not include an unsaturated, aliphatic carbon-carbon bond.

Scheme 8

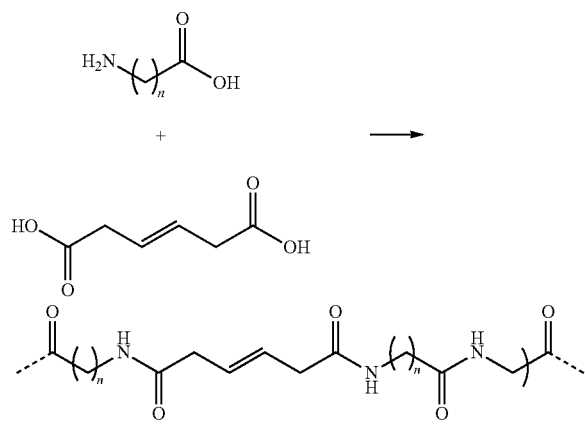

Scheme 9 illustrates a polycondensation reaction between an amino acid polyamide monomer, a polyamine polyamide monomer, and a polyacid polyamide monomer, where the C-1, C-2, and C-3 represent the portions of their respective polyamide monomer between the carboxylic acid and amine moieties (C-1), two amine moieties (C-2), and two carboxylic acid moieties (C-3) that participate in the polycondensation reaction. For the compositions and methods of the present disclosure, one or more of C-1, C-2, and C-3 may include at least one unsaturated, aliphatic carbon-carbon bond.

Scheme 10

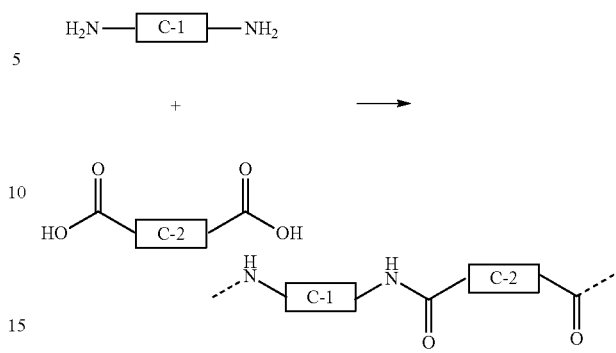

The polycondensation reaction examples of Schemes 1-10 are nonlimiting examples. Additional polyamide monomers may be included in such schemes. For example, Scheme 10 may include a third polyamide monomer that is a polyacid polyamide monomer having a C-3 portion between two amine moieties. Further Schemes 1-10 illustrate diacid polyamide monomers, diamine polyamide monomers, and amino acid polyamide monomers having one amine moiety and one carboxylic acid moiety. One skilled in the art will recognize how said schemes extend to polyacid polyamide monomers, polyamine polyamide monomers, and amino acid polyamide monomers having one or more amine moieties and one or more carboxylic acid moieties.

Scheme 9

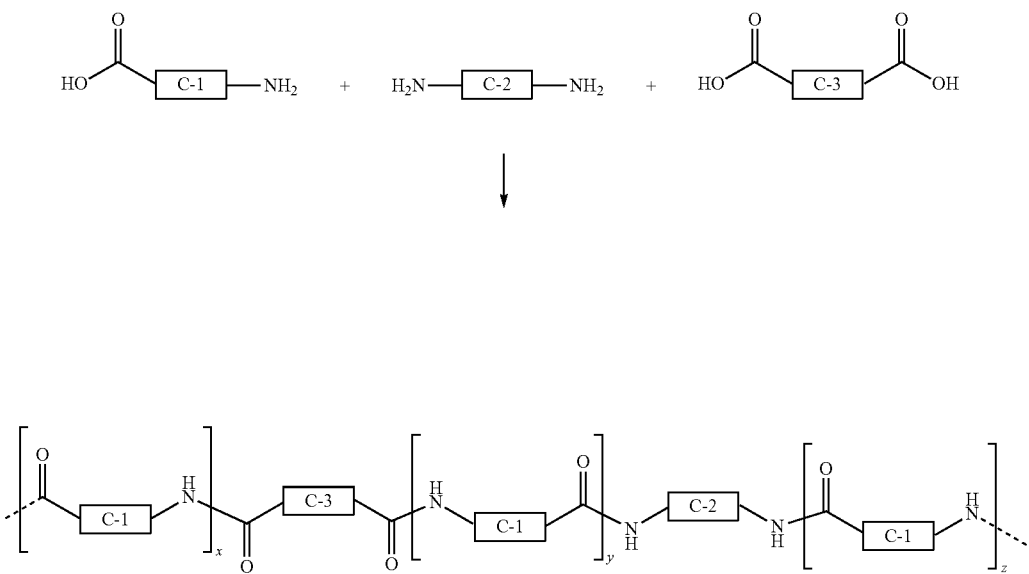

Scheme 10 illustrates a polycondensation reaction between a polyamine polyamide monomer and a polyacid polyamide monomer, where the C-1 and C-2 represent the portions of their respective polyamide monomer between the two amine moieties or the two carboxylic acid moieties that participate in the polycondensation reaction. For the compositions and methods of the present disclosure, the C-1, C-2, or both C-1 and C-2 may include at least one unsaturated, aliphatic carbon-carbon bond.

Scheme 11 illustrates a ring-opening reaction between a cyclic polyamide monomer and an amino acid polyamide monomer, where the C-1 represents the portion of the amino acid polyamide monomer between the amine and carboxylic acid moieties that participate in the reaction. For the compositions and methods of the present disclosure, the C-1 includes at least one unsaturated, aliphatic carbon-carbon bond.

Scheme 11

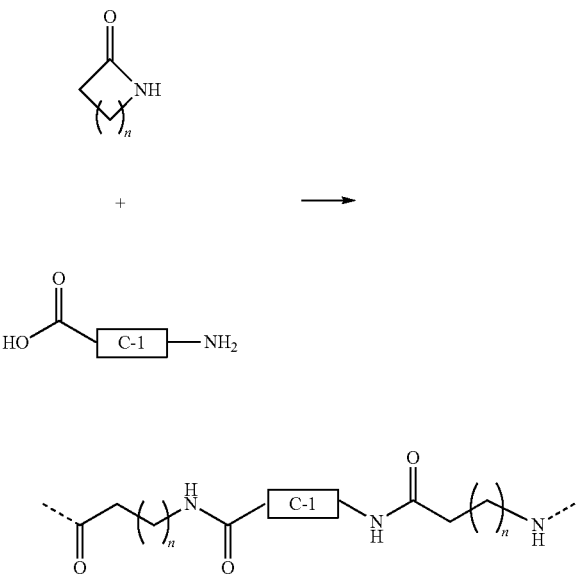

Scheme 12 illustrates a ring-opening reaction between a cyclic polyamide monomer and a polyacid polyamide monomer, where the C-1 represents the portion of the polyacid polyamide monomer between the two carboxylic acid moieties that participate in the reaction. For the compositions and methods of the present disclosure, the C-1 includes at least one unsaturated, aliphatic carbon-carbon bond.

Scheme 12

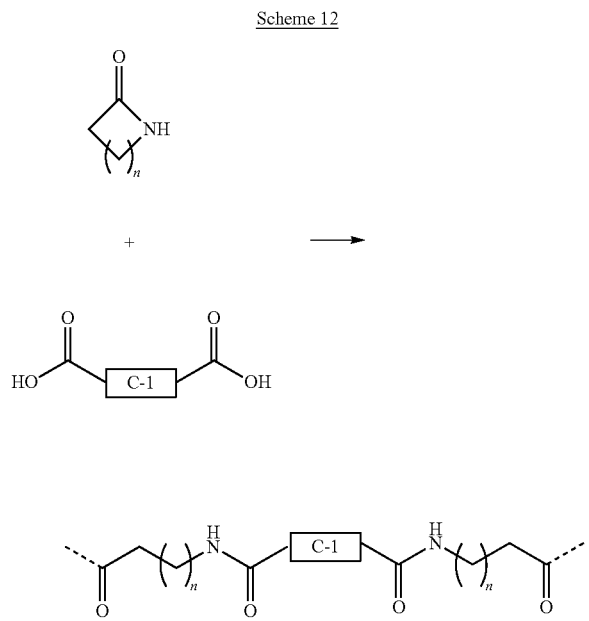

Scheme 13 illustrates a ring-opening reaction between a cyclic polyamide monomer and a polyamine polyamide monomer, where the C-1 represents the portion of the polyamine polyamide monomer between the two amine moieties that participate in the reaction. For the compositions and methods of the present disclosure, the C-1 includes at least one unsaturated, aliphatic carbon-carbon bond.

Scheme 13

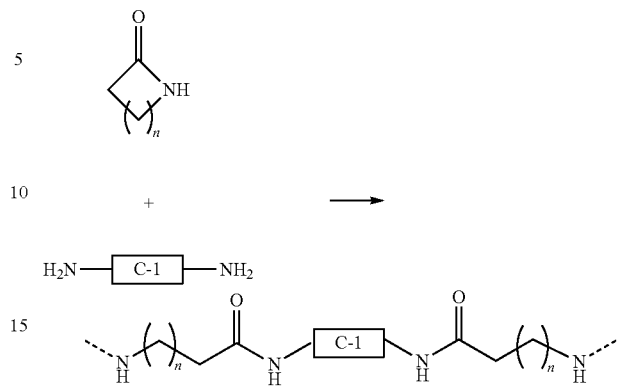

The ring-opening reaction examples of Schemes 11-13 are nonlimiting examples. Additional polyamide monomers may be included in such schemes. For example, Scheme 13 may include a third polyamide monomer that is a polyacid polyamide monomer having a C-2 portion between two carboxylic acid moieties. Further Schemes 11-13 illustrate diacid polyamide monomers, diamine polyamide monomers, and amino acid polyamide monomers having one amine moiety and one carboxylic acid moiety. One skilled in the art will recognize how said schemes extend to polyacid polyamide monomers, polyamine polyamide monomers, and amino acid polyamide monomers having one or more amine moieties and one or more carboxylic acid moieties.

Examples of amino acid polyamide monomers not having at least one unsaturated, aliphatic carbon-carbon bond suitable for use in polycondensations include, but are not limited to, $HN-(CH_2)_n-COOH$ where n is 1-20; branched aliphatic amino acids (e.g., $C_4$-$C_{20}$); cyclic-aliphatic amino acids (e.g., $C_4$-$C_{20}$); aromatic amino acids (e.g., 3-aminobenzoic acid, 4-aminobenzoic acid); and the like; and any combination thereof.

Examples of amino acid polyamide monomers having at least one unsaturated, aliphatic carbon-carbon bond include, but are not limited to, maleamic acid; N-propylmaleamic acid; and the like; and any combination thereof.

Examples of polyacid polyamide monomers not having at least one unsaturated, aliphatic carbon-carbon bond suitable for use in polycondensations include, but are not limited to, $HOOC-(CH_2)_n-COOH$ where n is 1-20 (e.g., adipic acid, terephthalic acid, isophthalic acid, pimelic acid, suberic acid, decanedioic acid, dodecanedioic acid); isophthalic acid; terephthalic acid; pent-2-enedioic acid; dodec-2-enedioic acid; succinic acid; glutaric acid; adipic acid; pimelic acid; suberic acid; azelaic acid; sebacic acid; undecanedioic acid; dodecanedioic acid; 1,3-cyclohexanedicarboxylic acid; and the like; and any combination thereof.

Examples of polyacid polyamide monomers having at least one unsaturated, aliphatic carbon-carbon bond include, but are not limited to, fumaric acid; maleic acid; glutaconic acid; aconitic acid; itaconic acid; and the like; and any combination thereof.

Examples of polyamine polyamide monomers not having at least one unsaturated, aliphatic carbon-carbon bond suitable for use in polycondensations include, but are not limited to, $HN-(CH_2)_n-NH$ where n is 1-20; 1,5-diamino-2-methylpentane; 1,2-diaminopropane; trimethylhexamethylenediamine; 2-methyloctane-1,8-diamine; n-methyl 1,6-hexamethylene diamine where n is 2 or 3; n-methyl 1,7- heptamethylene diamine where n is 2-4; n-methyl 1,8-octamethylene diamine where n is 2-4; n-methyl 1,12-dodecamethylene diamine where n is 2-6; 1,3-bis(aminomethyl)benzene; ortho-phenylene-bis(methylamine); 1,4-bis(aminomethyl)benzene; 1,4-cyclohexanediamine; 4-methylcyclohexane-1,3-diamine; 4-methylcyclohexane-1,3-diamine; diphenylethylenediamine; diphenylethylenediamine; 1,3-bis(aminomethyl)cyclohexane; 4,4'-methylenebis(cyclohexylamine); 4,4'-biphenyl di amine; 1,8-diaminonaphthalene; and the like; and any combination thereof.

Examples of polyamine polyamide monomers having at least one unsaturated, aliphatic carbon-carbon bond include, but are not limited to, 1,4-diamino-2-butene; 1,5-bis(3-aminophenyl)-1,4-pentadiene-3-one (DADBA); trans-4-cyclohexene-1,2-diamine; and the like; and any combination thereof.

Examples of cyclic polyamide monomers suitable for use in ring-opening polymerizations include, but are not limited to, azeridinone, 2-azetidinone, 2-pyrrolidinone, 2-piperidinone, ε-caprolactam, 2-azacyclooctanone, 2-azacyclononanone, 2-azacyclodecanone, 2-azacycloundecanone, 2-aza-cyclododecanone, laurolactam, butyrolactam, pivalolactam, ε-caprolactam, caprylolactam, enantholactam, undecanonelactam, laurolactam (dodecanolactam), and the like, and any combination thereof.

Polycondensation reactions (e.g., Schemes 1-10 and variations thereof) may be performed in the presence of an activator and/or metal salts. Examples of activators include, but are not limited to, triphenyl phosphine; and the like; and any combination thereof. Examples of metal salts include, but are not limited to, calcium chloride; cesium fluoride; and the like; and any combination thereof.

Polycondensation reactions (e.g., Schemes 1-10 and variations thereof) may be performed at about 50° C. to about 200° C. (or about 50° C. to about 100° C., or about 75° C. to about 150° C., or about 125° C. to about 200° C.).

Polycondensation reactions (e.g., Schemes 1-10 and variations thereof) may be performed for about 5 minutes to about 24 hours (or about 5 minutes about 6 hours, or about 2 hours to about 12 hours, or about 6 hours to about 24 hours).

Polycondensation reactions (e.g., Schemes 1-10 and variations thereof) may be performed in a solvent that includes, but is not limited to, N-methyl pyrrolidone (NMP), pyridine, dichloromethane, dimethyl sulfoxide (DMSO), N,N-dimethylformamide, acetonitrile, tetrahydrofuran, and the like, and any combination thereof.

Polycondensation reactions (e.g., Schemes 1-10 and variations thereof) may be performed with a molar ratio of polyamide monomers having at least one unsaturated, aliphatic carbon-carbon bond (cumulatively) to polyamide monomers not having at least one unsaturated, aliphatic carbon-carbon bond (cumulatively) of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500). The more polyamide monomers having at least one unsaturated, aliphatic carbon-carbon bond included in the polycondensation reaction, the more locations for possible crosslinking (e.g., during consolidation in an additive manufacturing method).

Ring-opening polymerization reactions (e.g., Schemes 11-13 and variations thereof) may be performed in the presence of an activator and/or metal salts. Examples of activators include, but are not limited to, triphenyl phosphine; and the like; and any combination thereof. Examples of metal salts include, but are not limited to, calcium chloride; cesium fluoride; and the like; and any combination thereof.

Ring-opening polymerization reactions (e.g., Schemes 11-13 and variations thereof) may be performed at about 50° C. to about 200° C. (or about 50° C. to about 100° C., or about 75° C. to about 150° C., or about 125° C. to about 200° C.).

Ring-opening polymerization reactions (e.g., Schemes 11-13 and variations thereof) may be performed for about 5 minutes to about 24 hours (or about 5 minutes about 6 hours, or about 2 hours to about 12 hours, or about 6 hours to about 24 hours).

Ring-opening polymerization reactions (e.g., Schemes 11-13 and variations thereof) may be performed in a solvent that includes, but is not limited to, N-methyl pyrrolidone (NMP), pyridine, dichloromethane, dimethyl sulfoxide (DMSO), N,N-dimethylformamide, acetonitrile, tetrahydrofuran, and the like, and any combination thereof.

Ring-opening polymerization reactions (e.g., Schemes 11-13 and variations thereof) may be performed with a molar ratio of polyamide monomers having at least one unsaturated, aliphatic carbon-carbon bond (cumulatively) to polyamide monomers not having at least one unsaturated, aliphatic carbon-carbon bond (cumulatively) of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500). The more polyamide monomers having at least one unsaturated, aliphatic carbon-carbon bond included in the polycondensation reaction, the more locations for possible crosslinking.

The resultant unsaturated polyamides from any suitable synthesis route may have a molar equivalent of polyamide units having at least one unsaturated, aliphatic carbon-carbon bond to polyamide units not having at least one unsaturated, aliphatic carbon-carbon bond of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500).

Initiator-Doped, Unsaturated Polyamide Compositions and Methods

Methods and compositions described herein include unsaturated polyamides that are doped with initiators suitable for crosslinking the unsaturated polyamides (e.g., during consolidation in an additive manufacturing method). The initiators may be thermal initiators, photoinitiators, or a combination of thermal initiators and photoinitiators.

Examples of thermal initiators include, but are not limited to, ammonium persulfate; sodium persulfate; potassium persulfate; organic peroxides (e.g., benzoyl peroxide, t-amyl peracetate, 2,5-dimethyl-2,5-bis(t-butylperoxy)-3-hexyne, 2,5-dimethyl-2,5-di-(t-butylperoxy)-hexane, t-butyl alpha-cumyl peroxide, di-butyl peroxide, t-butyl hydroperoxide, dichlorobenzoyl peroxide, dicumyl peroxide, di-t-butyl peroxide, 2,5 dimethyl-2,5-di(peroxy benzoate)-3-hexyne, 1,3-bis(t-butyl peroxy isopropyl)benzene, lauroyl peroxide, di-t-amyl peroxide, 1,1-di-(t-butylperoxy)cyclohexane, 2,2-di-(t-butylperoxy) butane, and 2,2-di-(t-amylperoxy) propane); 2,2'-azobis(2-methylpropanenitrile; 2,2'-azobis(isobutyronitrile) (AIBN); 1,1'-azobis(cyclohexanecarbonitrile); 1,1'-azobis(cyanocyclhexane); 2,2'-azodi(2-methylbutyronitrile; 2-methyl 2-2'-azobis propanenitrile; 2-2'-azobis isobutyramide dehydrate; 2; 2'-azobis(2-methyl-N-phenylpropionamidine) dihydrochloride; 2,2'-azobis[N-(4-chlorophenyl)-2-methylpropionamidine]dihydrochloride; 2,2'-azobis[N-(4-hydroxyphenyl)-2-methyl-propionamidine]dihydrochloride; 2,2'-azobis[N-(4-amino-phenyl)-2-methylpropionamidine] tetrahydrochloride; 2,2'-azobis[2-methyl-N(phenylmethyl)propionamidine]dihydrochloride; 2,2'-azobis[2-methyl-N-2-propenylpropionamidine]dihydrochloride; 2,2'-azobis[N-(2-hydroxy-ethyl)-2-methylpropionamidine] dihydrochloride; 2,2'-azobis[2(5-methyl-2-imidazolin-2-yl)propane]dihydrochloride; 2,2'-azobis[2-(2-imidazolin-2-yl)propane]dihydrochloride; 2,2'-azobis[2-(4,5,6,7-tetrahydro-1H-1,3-diazepin-2-yl)propane]dihydrochloride; 2,2'-azobis[2-(3,4,5,6-tetrahydropyrimidin-2-yl)propane] dihydrochloride; 2,2'-azobis[2-(5-hydroxy-3,4,5,6-tetrahydropyrimidin-2-yl)propane]dihydrochloride; 2,2'-azobis {2-[1-(2-(2-hydroxyethyl)-2-imidazolin-2-yl]propane}dihydrochloride; 2,2'-azobis(4-methoxy-2,4-dimethylvaleronitrile); 2,2'-azobis(2,4-dimethylvaleronitrile); 1,1'-azobis(cycl hexane-1-carbonitrile); dimethyl 2,2'-azobis(2-methylpropionate); 2,2'-azobis (N-butyl-2-methylpropionamide); 2,2'-azobis[2-methyl-N-(2-hydroxyethyl)propionamide]; 2,2'-azobis[N-(2-carboxyethyl)-2-methylpropionamide]tetrahydrate; and the like; and any combination thereof.

Examples of photoinitiators include, but are not limited to, (±)-camphorquinone; acetophenone; 3-acetophenol; 4-acetophenol; benzophenone; 2-methylbenzylphenone; 3-methylbenzophenone; 3-hydroxybenzophenone; 3,4-dimethylbenxophenone; 4-hydroxybenzophenone; 4-benzoylbenzoic acid; 2-benzoylbenzoic acid; methyl-2-benzoylbenzoate; 4,4'-dihydroxybenzophenone; 4-(dimethylamino)-benzophenone; 4,4'-bis(dimethylamino)-benzophenone; 4,4'-bis(diethylamino)-benzophenone; 4,4'-dichlorobenzophenone; 4-(p-tolylthio)benzophenone; 4-phenylbenzophenone; 1,4-dibenzoylbenzene; benzil; 4,4'-dimethylbenzil; p-anisil; 2-benzoyl-2-propanol; 2-hydroxy-4'-(2-hydroxyethoxy)-2-methylpropiophenone; 1-benzoylcyclohexanol; benzoin; anisoin; benzoin methyl ether; benzoin ethyl ether; benzoin isopropyl ether; benzoin isobutyl ether; o-tosylbenzoin; 2,2-diethoxyacetophenone; benzil dimethylketal; 2-methyl-4'-(methylthio)-2-morpholinopropiophenone; 2-benzyl-2-(dimethylamino)-4'-morpholinobutyrophenone; 2-isonitrosopropiophenone; anthraquinone; 2-ethylanthraquinone; sodium anthraquinone-2-sulfonate monohydrate; 9,10-phenanthrenequinone; 9,10-phenanthrenequinone; dibenzosuberenone; 2-chlorothioxanthone; 2-isopropylthioxanthone; 2,4-diethylthiozanthene-9-one; 2,2'-bis(2-chlorophenyl)-4,4',5,5'-tetraphenyl-1,2'-biimidazole; diphenyl (2,4,6-trimethylbenzoyl)phosphine oxide; phenylbis(2,4,6-trimethylbenzoyl)phosphine oxide (TPO); acyl phosphine oxide (APO); bis acyl phosphine oxide (BAPO); lithium phenyl(2,4,6-trimethylbenzoyl)phosphinate; and the like; and any combination thereof.

Several methods of doping the unsaturated polyamides with initiators may be used. Generally, doping may occur by melt blending, dry blending (defined above), wet blending (defined above), or a combination thereof.

In melt blending, one or more unsaturated polyamides is melted and mixed with one or more initiators. In such blending, other additives (e.g., other thermoplastic polymers, fillers, and the like) may optionally be included. However, the melt temperature should be below the temperature at which the one or more initiators cause crosslinking. Generally, melt blending methods are limited because of the limited initiators available to be used at the temperatures required to melt unsaturated polyamides.

In dry blending, one or more unsaturated polyamides may be mixed with one or more initiators. In such blending, other additives (e.g., other thermoplastic polymers, fillers, and the like) may optionally be included. In dry blending, each of the components being blended should have less than 10 wt % of solvent and/or dispersant (e.g., water, methanol, acetone, and the like, and any combination) present by weight of said component. Dry blending may be performed in a blender or other mixer that creates sheer that breaks up particulates of the unsaturated polyamides and/or initiators. In some instances, the initiators may be liquid at room temperature. In such cases, the initiators may coat and/or absorb into the unsaturated polyamide particles.

In wet blending, one or more unsaturated polyamides may be mixed with one or more initiators in the presence of a solvent and/or dispersant (e.g., water, methanol, acetone, and the like, and any combination). In such blending, other additives (e.g., other thermoplastic polymers, fillers, and the like) may optionally be included. In the methods described herein, generally, the one or more unsaturated polyamides, typically as solid particles, may be dispersed in a fluid, and one or more initiators (either dry or wet) may be added to said dispersion and/or in the fluid addition of the unsaturated polyamides. Again, other additive may be included in said dispersion. The dispersion may be mixed for a desired amount of time (e.g., about 15 minutes to about 1 day, or about 30 minutes to about 3 hours), then filtered, washed, and dried to remove the fluid (preferably drying such that less than 10 wt % fluid remains). In some instances, during mixing, the initiators may absorb into the unsaturated polyamide particles.

In each blending method, an aim is to produce a mixture of the one or more unsaturated polyamides and the one or more initiators.

The weight ratio of unsaturated polyamide (cumulatively) to initiator (cumulatively) may be about 90:10 to about 99:1.

Selective Laser Sintering with Initiator-Doped, Unsaturated Polyamides

As described herein, SLS uses polymer particles (or powders) to produce objects. The methods and compositions of the present disclosure include particles that comprise an unsaturated polyamide described herein and an initiator.

The particles may be produced by precipitation methods, cryogenic milling methods, or melt emulsification methods. Depending on the method, the initiator may be present during formation of the particle and/or after formation of the particles.

An example precipitation method to produce particles is direct emulsion polymerization where the polycondensation and/or ring-opening reactions described herein are performed in an emulsion. The discontinuous phase of the emulsion is where the polycondensation reaction occurs. Then, when the reaction is stopped, the discontinuous phase becomes the unsaturated polyamide particles. In this example, doping with initiator is performed preferably after formation of the unsaturated polyamide particles. If the initiator were present during the polycondensation reaction, crosslinking may occur. Therefore, initiator-doped, unsaturated polyamide particles are preferably formed by first forming the unsaturated polyamide particles by direct emulsion polymerization and precipitation, then wet and/or dry blending of the resultant particles with the initiator. By way of nonlimiting example, a method of the present disclosure may comprise: emulsion polymerizing via polycondensation and/or ring-opening reactions (e.g., via one or more of Schemes 1-13) between a first polyamide monomer and a second polyamide monomer, wherein the second polyamide monomer comprises at least one unsaturated, aliphatic carbon-carbon bond to produce an unsaturated polyamide; precipitating the unsaturated polyamide as particles; and blending (via wet and/or dry blending) an initiator with the particles comprising the unsaturated polyamide.

In another particle production example, unsaturated polyamide may be dissolved in a solvent (e.g., ethanol or propanol) under high pressure and high temperature (e.g., about 100° C. to about 150° C.). Upon cooling, the unsaturated polyamide precipitates into particles. Herein, this method is referred to as thermally-induced precipitation. In this example, the initiator may be present with the unsaturated polyamide after precipitation. Alternatively or in addition to such embodiments, the precipitated particles may be wet and/or dry blended with the initiator. By way of nonlimiting example, a method of the present disclosure may comprise: dissolving an unsaturated polyamide (e.g., products of one or more of Schemes 1-13) in a solvent; precipitating the unsaturated polyamide as particles; and blending (via wet and/or dry blending) an initiator with the particles comprising the unsaturated polyamide. In another nonlimiting example, a method of the present disclosure may comprise: dissolving an unsaturated polyamide (e.g., products of one or more of Schemes 1-13) and an initiator in a solvent; and precipitating the unsaturated polyamide to yield particles comprising the unsaturated polyamide and the initiator.

In yet another example, unsaturated polyamides may be cryogenically cooled and milled to produce particles. In this example, the initiator may be present with the unsaturated polyamides before cryogenic milling. Alternatively or in addition to such embodiments, the resultant particles may be wet and/or dry blended with the initiator. By way of nonlimiting example, a method of the present disclosure may comprise: cryogenically cooling an unsaturated polyamide (e.g., products of one or more of Schemes 1-13); milling the cryogenically cooled unsaturated polyamide to yield particles; and blending (via wet and/or dry blending) an initiator with the particles comprising the unsaturated polyamide. In another nonlimiting example, a method of the present disclosure may comprise: cryogenically cooling an unsaturated polyamide (e.g., products of one or more of Schemes 1-13) in the presence of an initiator; and milling the cryogenically cooled unsaturated polyamide to yield particles comprising the unsaturated polyamide and the initiator.

In another example, unsaturated polyamides may be formed into particles by melt emulsification (described in more detail herein). In this example, the initiator may be present in the melt. However, as discussed herein, the temperature of the melt is preferably lower than a temperature that causes the initiator to crosslink the unsaturated polyamides. Alternatively or in addition to such embodiments, the resultant particles may be wet and/or dry blended with the initiator. By way of nonlimiting example, a method of the present disclosure may comprise: melt emulsifying an unsaturated polyamide (e.g., products of one or more of Schemes 1-13); cooling the melt emulsion to yield particles; and blending (via wet and/or dry blending) an initiator with the particles comprising the unsaturated polyamide. In another nonlimiting example, a method of the present disclosure may comprise: melt emulsifying an unsaturated polyamide (e.g., products of one or more of Schemes 1-13) in the presence of an initiator; and cooling the melt emulsion to yield particles comprising the unsaturated polyamide and the initiator.

For thermally induced precipitation, cryogenic milling, and melt emulsification, the particles produced comprise the unsaturated polyamide, optionally a thermoplastic polymer different than the unsaturated polyamide, and optionally a compatibilizer. That is, the starting material for such methods may comprise the unsaturated polyamide, optionally a thermoplastic polymer different than the unsaturated polyamide, and optionally a compatibilizer. For example, the thermoplastic polymer and optionally a compatibilizer may be dissolved in the solvent before precipitation in the thermally-induced precipitation methods. In another example, the unsaturated polyamide may be melt blended with a thermoplastic polymer different than the unsaturated polyamide and optionally a compatibilizer. The resultant blended polymer may be used in cryogenic milling methods. In yet another example, the components of the melt emulsification may comprise the unsaturated polyamide, the thermoplastic polymer different than the unsaturated polyamide, and optionally a compatibilizer.

The thermoplastic polymer may also have unsaturation sites that participate in the crosslinking. The thermoplastic polymer may not participate in the crosslinking but provide other mechanical, thermal, or physical properties. Combinations of the two foregoing types of thermoplastic polymers may be included.

When included a weight ratio of unsaturated polyamide (cumulatively) to the thermoplastic polymer different than the unsaturated polyamide (cumulatively) may be about 500:1 to about 1:10 (or about 500:1 to about 100:1, or about 250:1 to about 50:1, or about 100:1 to about 10:1, or about 50:1 to about 1:1, or about 25:1 to about 1:10). The more of the thermoplastic polymer different than the unsaturated polyamide included, provided said thermoplastic polymer does not participate in crosslinking, reduces the amount of crosslinking in the resultant object formed by SLS methods.

Examples of thermoplastic polymers include, but are not limited to, saturated polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The other thermoplastic polymers in the compositions and methods of the present disclosure may be elastomeric or non-elastomeric. Some of the foregoing examples of other thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in the "Handbook of Thermoplastic Elastomers," 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Examples of polyamides include, but are not limited to, polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof. Copolyamides may also be used. Examples of copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Examples of polyamide elastomers include, but are not limited to, polyesteramide, polyetheresteramide, polycarbonate-esteramide, and polyether-block-amide elastomers.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy unsaturated polyamides with one or more thermoplastic polymers. Examples of polymer compatibilizers include, but are not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like, and any combination thereof.

As described herein, SLS methods use heat from the laser and other sources (e.g., the chamber may be heated below the melting temperature of the polymer in the particles) to consolidate particles. To enhance the heating caused by the laser, the particles used in the SLS methods may include and/or be mixed with infrared absorbers. Generally, infrared absorbers absorb electromagnetic radiation (e.g., at one or more wavelengths from about 100 nm to about 1 mm) and produce heat. The infrared absorbers may accelerate initiation of the initiator and, consequently, crosslinking (e.g., during consolidation in an additive manufacturing method).

Examples of infrared absorbers include, but are not limited to, colorants and/or pigments (e.g., organic or inorganic, and synthetic or natural) such as carbon black, charcoal, carbon fibers, carbon nanotubes, graphite, copper hydroxide phosphate, chalk, bone, interference pigments (e.g., IRIODIN™, available from Merck), pearlescent pigments, metal oxide-coated mica pigments; oxides and sulphides such as antimony oxide, tin oxide, indium oxide, zinc oxide, zinc sulphide, tin sulphide or mixtures thereof; flame-proofing agents such as those based on melamine cyanurate (ME-LAPUR®, available from DSM) or those based on phosphorus, preferably phosphates, phosphites, phosphonites, or elemental red phosphorus; carbon fibers; glass beads (hollow, porous, or solid); kaolin, wollastonite; and the like; and any combination thereof. Said infrared absorbers may be dispersed as-is or on a substrate like mica that is then dispersed. Infrared absorbers may be present in and incorporated with the particles as described relative to the initiator.

The particles used in the SLS methods described herein may include (a) initiator-doped, unsaturated polyamide particles that comprise the unsaturated polyamide, the initiator, optionally the infrared absorber, optionally a thermoplastic polymer different than the unsaturated polyamide, optionally a compatibilizer, and optionally other additives and optionally (b) other thermoplastic particles that comprise a thermoplastic polymer different than the unsaturated polyamide and optionally a compatibilizer.

SLS methods may include: depositing initiator-doped, unsaturated polyamide particles (and optionally other thermoplastic particles) upon a surface; and once deposited, heating at least a portion of the particles to promote consolidation of the particles and crosslinking of the unsaturated polyamide to form a consolidated body (object). Without being limited by theory, it is believed that the heating of the particles and/or the exposure to the laser causes the initiator to initiate crosslinking the unsaturated bonds in the unsaturated polyamide.

Examples of objects that may be produced by SLS methods that utilize the unsaturated polyamides described herein may be all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

Melt Emulsification Methods and Resultant Particles

The FIGURE a flow chart of a nonlimiting example method 100 of the present disclosure. Thermoplastic polymer 102 (comprising one or more unsaturated polyamides described herein and optionally one or more other thermoplastic polymers described herein), carrier fluid 104, and optionally emulsion stabilizer 106 are combined 108 to produce a mixture 110. The components 102, 104, and 106 can be added in any order and include mixing and/or heating during the process of combining 108 the components 102, 104, and 106.

Optionally, other additives like the initiators, the infrared absorbers, and the compatibilizers described herein may be included in the mixture and combined with the components 102, 104, and 106 in any order.

The mixture 110 is then processed 112 by applying sufficiently high shear to the mixture 110 at a temperature greater than the melting point or softening temperature of the thermoplastic polymer 102 to form a melt emulsion 114. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 114). Without being limited by theory, it is believed that, all other factors being the same, increasing shear should decrease the size of the droplets of the polymer melt in the carrier fluid 104. However, at some point there may be diminishing returns on increasing shear and decreasing droplet size or may be disruptions to the droplet contents that decrease the quality of particles produced therefrom.

The melt emulsion 114 inside and/or outside the mixing vessel is then cooled 116 to solidify the polymer droplets into thermoplastic polymer particles (also referred to as solidified thermoplastic polymer particles). The cooled mixture 118 can then be treated 120 to isolate the thermoplastic polymer particles 122 from other components 124 (e.g., the carrier fluid 104, excess emulsion stabilizer 106, and the like) and wash or otherwise purify the thermoplastic polymer particles 122. The thermoplastic polymer particles 122 comprise the thermoplastic polymer 102 and, when included, at least a portion of the emulsion stabilizer 106 coating the outer surface of the thermoplastic polymer particles 122. Emulsion stabilizers 106, or a portion thereof, may be deposited as a uniform coating on the thermoplastic polymer particles 122. In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of thermoplastic polymer particles 122 in the course of becoming associated therewith. Even without embedment taking place, at least the nanoparticles within emulsion stabilizers 106 may remain robustly associated with thermoplastic polymer particles 122 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates.

Advantageously, carrier fluids and washing solvents of the systems and methods described herein (e.g., method 100) can be recycled and reused. One skilled in the art will recognize any necessary cleaning of used carrier fluid and solvent necessary in the recycling process.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten polyamide 102 and the carrier fluid 104. The differences in viscosity may affect droplet breakup and particle size distribution. Without being limited by theory, it is believed that when the viscosities of the molten polyamide 102 and the carrier fluid 104 are too similar, the circularity of the product as a whole may be reduced where the particles are more ovular and more elongated structures are observed.

The thermoplastic polymers 102 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 110. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 110 or well in advance.

When describing component amounts in the compositions described herein (e.g., the mixture 110 and thermoplastic polymer particles 122), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 110 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 110 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm$^3$ to about 1.5 g/cm$^3$, and the thermoplastic polymer 102 has a density of about 0.7 g/cm$^3$ to about 1.7 g/cm$^3$, wherein the thermoplastic polymer has a density similar, lower, or higher than the density of the carrier fluid.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g)), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

Nanoparticles may be included in the mixture 110 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly[dimethylsoxane-co[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 110 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 110 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 108 the components 102, 104, and 106. For example, the emulsion stabilizer 106 may first be dispersed in the carrier fluid 104, optionally with heating said dispersion, before adding the thermoplastic polymer 102. In another nonlimiting example, the thermoplastic polymer 102 may be heated to produce a polymer melt to which the carrier fluid 104 and emulsion stabilizer 106 are added together or in either order. In yet another nonlimiting example, the thermoplastic polymer 102 and carrier fluid 104 can be mixed at a temperature greater than the melting point or softening temperature of the thermoplastic polymer 102 and at a shear rate sufficient enough to disperse the thermoplastic polymer melt in the carrier fluid 104. Then, the emulsion stabilizer 106 can be added to form the mixture 110 and maintained at suitable process conditions for a set period of time.

Combining 108 the components 102, 104, and 106 in any combination can occur in a mixing apparatus used for the processing 112 and/or another suitable vessel. By way of nonlimiting example, the thermoplastic polymer 102 may be heated to a temperature greater than the melting point or softening temperature of the thermoplastic polymer 102 in the mixing apparatus used for the processing 112, and the emulsion stabilizer 106 may be dispersed in the carrier fluid 104 in another vessel. Then, said dispersion may be added to the melt of the thermoplastic polymer 102 in the mixing apparatus used for the processing 112.

The mixing apparatuses used for the processing 112 to produce the melt emulsion 114 should be capable of maintaining the melt emulsion 114 at a temperature greater than the melting point or softening temperature of the thermoplastic polymer 102 and applying a shear rate sufficient to disperse the polymer melt in the carrier fluid 104 as droplets.

Examples of mixing apparatuses used for the processing 112 to produce the melt emulsion 114 include, but are not limited to, extruders (e.g., continuous extruders, batch extruders, and the like), stirred reactors, blenders, reactors with inline homogenizer systems, and the like, and apparatuses derived therefrom.

Processing 112 and forming the melt emulsion 114 at suitable process conditions (e.g., temperature, shear rate, and the like) for a set period of time.

The temperature of processing 112 and forming the melt emulsion 114 should be a temperature greater than the melting point or softening temperature of the thermoplastic polymer 102 and less than the decomposition temperature of any components 102, 104, and 106 in the mixture 110. For example, the temperature of processing 112 and forming the melt emulsion 114 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 112 and forming the melt emulsion 114 is less than the decomposition temperature of any of components 102, 104, and 106 in the mixture 110.

The shear rate of processing 112 and forming the melt emulsion 114 should be sufficiently high to disperse the polymer melt in the carrier fluid 104 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 112 and forming the melt emulsion 114 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 112 can be stopped. That time may depend on, among other things, the temperature, shear rate, thermoplastic polymer 102 composition, the carrier fluid 104 composition, and the emulsion stabilizer 106 composition.

The melt emulsion 114 may then be cooled 116. Cooling 116 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 114. In some instances, the shear applied during heating may be applied during cooling.

The cooled mixture 118 resulting from cooling 116 the melt emulsion 114 comprises solidified thermoplastic polymer particles 122 (or simply thermoplastic polymer particles) and other components 124 (e.g., the carrier fluid 104, excess emulsion stabilizer 106, and the like). The thermoplastic polymer particles may be dispersed in the carrier fluid or settled in the carrier fluid.

The cooled mixture 118 may then be treated 120 to the separate thermoplastic polymer particles 122 (or simply thermoplastic polymer particles 122) from the other components 124. Suitable treatments include, but are not limited to, washing, filtering, centrifuging, decanting, and the like, and any combination thereof.

Solvents used for washing the thermoplastic polymer particles 122 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the thermoplastic polymer particles 122 by drying using an appropriate method such as air drying, heat drying, reduced pressure drying, freeze drying, or a hybrid thereof. The heating may be performed preferably at a temperature lower than the glass transition point of the thermoplastic polymer (e.g., about 50° C. to about 150° C.).

The thermoplastic polymer particles 122 after separation from the other components 124 may optionally be further classified to produce purified thermoplastic polymer particles 128. For example, to narrow the particle size distribution (or reduce the diameter span), the thermoplastic polymer particles 122 can be passed through a sieve having a pore size of about 10 μm to about 250 μm (or about 10 μm to about 100 μm, or about 50 μm to about 200 μm, or about 150 μm to about 250 μm).

In another example of a purification technique, the thermoplastic polymer particles 122 may be washed with water to remove surfactant while maintaining substantially all of the nanoparticles associated with the surface of the thermoplastic polymer particles 122. In yet another example of a purification technique, the thermoplastic polymer particles 122 may be blended with additives to achieve a desired final product. For clarity, because such additives are blended with the thermoplastic particles 122 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the thermoplastic polymer particles 122 may be unwanted in downstream applications. Accordingly, yet another example of a purification technique may include at least substantial removal of the surfactant from the thermoplastic polymer particles 122 (e.g., by washing and/or pyrolysis).

The thermoplastic polymer particles 122 and/or purified thermoplastic polymer particles 128 (referred to as particles 122/128) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 122/128, in general, includes emulsion stabilizers (a) dispersed on an outer surface of the particles 122/128 and/or (b) embedded in an outer portion (e.g., outer 1 vol %) of the particles 122/128.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The particles 122/128 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 122/128.

The thermoplastic polymer 102 may be present in the particles 122/128 at about 90 wt % to about 99.5 wt % (or about 90 wt % to about 95 wt %, or about 92 wt % to about 97 wt %, or about 95 wt % to about 99.5 wt %) of the particles 122/128.

When included, the emulsion stabilizers 106 may be present in the particles 122/128 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 122/128. When purified to at least substantially remove surfactant or another emulsion stabilizer, the emulsion stabilizers 106 may be present in the particles 128 at less than 0.01 wt % (or 0 wt % to about 0.01 wt %, or 0 wt % to 0.001 wt %).

Upon forming thermoplastic particulates according to the disclosure herein, at least a portion of the nanoparticles, such as silica nanoparticles, may be disposed as a coating upon the outer surface of the thermoplastic particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the scanning electron microscope images (SEM micrographs). The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs The particles 122/128 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The particles 122/128 may also have a diameter span of about 0.4 to about 3 (or about 0.6 to about 2, or about 0.4 to about 1.5, or about 1 to about 3). Without limitation, diameter span values of 1.0 or greater are considered broad, and diameter span values of 0.75 or less are considered narrow. For example, the particles 122/128 may have a D10 of about 5 μm to about 30 μm, a D50 of about 30 μm to about 100 μm, and a D90 of about 70 μm to about 120 μm, wherein D10<D50<D90.

The particles 122/128 may also have a diameter span of about 0.4 to about 3 (or about 0.6 to about 2, or about 0.4 to about 1.5, or about 1 to about 3).

In a first nonlimiting example, the particles 122/128 may have a D10 of about 0.5 μm to about 5 μm, a D50 of about 0.5 μm to about 10 μm, and a D90 of about 3 μm to about 15 μm, wherein D10<D50<D90.

In a second nonlimiting example, the particles 122/128 may have a D10 of about 1 μm to about 50 μm, a D50 of about 25 μm to about 100 μm, and a D90 of about 60 μm to about 300 μm, wherein D10<D50<D90.

In a third nonlimiting example, the particles 122/128 may have a D10 of about 5 μm to about 30 μm, a D50 of about 30 μm to about 70 μm, and a D90 of about 70 μm to about 120 μm, wherein D10<D50<D90. Said particles 122/128 may have a diameter span of about 1.0 to about 2.5.

In a fourth nonlimiting example, the particles 122/128 may have a D10 of about 25 μm to about 60 μm, a D50 of about 60 μm to about 110 μm, and a D90 of about 110 μm to about 175 μm, wherein D10<D50<D90. Said particles 122/128 may have a diameter span of about 0.6 to about 1.5.

In a fifth nonlimiting example, the particles 122/128 may have a D10 of about 75 μm to about 125 μm, a D50 of about 100 μm to about 200 μm, and a D90 of about 125 μm to about 300 μm, wherein D10<D50<D90. Said particles 122/128 may have a diameter span of about 0.2 to about 1.2.

The particles 122/128 may have a circularity of about 0.7 or greater (or about 0.90 to about 1.0, or about 0.93 to about 0.99, or about 0.95 to about 0.99, or about 0.97 to about 0.99, or about 0.98 to 1.0).

The particles 122/128 may have an angle of repose of about 25° to about 45° (or about 25° to about 35°, or about 30° to about 40°, or about 35° to about 45°).

The particles 122/128 may have a Hausner ratio of about 1.0 to about 1.5 (or about 1.0 to about 1.2, or about 1.1 to about 1.3, or about 1.2 to about 1.35, or about 1.3 to about 1.5).

The particles 122/128 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 112 and the composition and relative concentrations of the components 102, 104, and 106, different shapes of the structures that compose the particles 122/128 have been observed. Typically, the particles 122/128 comprise substantially spherical particles (having a circularity of about 0.97 or greater). However, other structures including disc and elongated structures have been observed in the particles 122/128. Therefore, the particles 122/128 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 122/128 may have a sintering window that is within 10° C., preferably within 5° C., of the sintering window of the thermoplastic polymer 102.

NONLIMITING EXAMPLES

A first nonlimiting example embodiment of the present disclosure is a composition comprising: particles comprising an unsaturated polyamide and an initiator. The first nonlimiting example embodiment may further include one or more of: Element 1: wherein the particles have a circularity of about 0.9 to about 1.0; Element 2: wherein a weight ratio of the unsaturated polyamide to the initiator is about 90:10 to about 99:1; Element 3: wherein the particles further comprise an infrared absorber; Element 4: the composition further comprising: an infrared absorber admixed with the particles; Element 5: wherein the particles further comprise a thermoplastic polymer that is not the unsaturated polyamide; Element 6: wherein the particles further comprise an emulsion stabilizer associated with an outer surface of the particles; Element 7: Element 6 and wherein at least some of the particles have a void comprising the emulsion stabilizer at a void/polymer interface; Element 8: Element 6 and wherein the emulsion stabilizer comprises nanoparticles, and wherein the nanoparticles are embedded in the outer surface of the particles; Element 9: wherein the particles have a D10 of about 0.1 µm to about 125 µm, a D50 of about 0.5 µm to about 200 µm, and a D90 of about 3 µm to about 300 µm, wherein D10<D50<D90; Element 10: wherein the particles have a diameter span of about 0.2 to about 10; and Element 11: wherein the solidified particles have a Hausner ratio of about 1.0 to about 1.5. Examples of combinations include, but are not limited to, Element 1 in combination with one or more of Elements 2-11; Element 2 in combination with one or more of Elements 3-11; Element 3 in combination with one or more of Elements 4-11; Element 4 in combination with one or more of Elements 5-11; Element 6 (optionally in combination with Element 7 and/or Element 8) in combination with one or more of Elements 9-11; and two or more of Elements 9-11 in combination.

A second nonlimiting example embodiment is a method comprising: depositing the composition of first nonlimiting example embodiment (optionally with one or more of Elements 1-11) optionally in combination with other thermoplastic polymer particles upon a surface; and once deposited, heating at least a portion of the particles to promote consolidation thereof and crosslinking of the unsaturated polyamide, thereby forming a consolidated body comprising a crosslinked polyamide.

A third nonlimiting example embodiment is a method comprising: mixing a mixture comprising an unsaturated polyamide, a carrier fluid that is immiscible with the unsaturated polyamide, and optionally an emulsion stabilizer at a temperature greater than a melting point or softening temperature of the unsaturated polyamide and at a shear rate sufficiently high to disperse the unsaturated polyamide in the carrier fluid; and cooling the mixture to below the melting point or softening temperature of the unsaturated polyamide to form unsaturated polyamide particles comprising the unsaturated polyamide and the emulsion stabilizer, when present, associated with an outer surface of the unsaturated polyamide particles. The first nonlimiting example embodiment may further include one or more of: Element 1; Element 9; Element 10; Element 11; Element 12: the method further comprising: dry blending the unsaturated polyamide particles with an initiator, wherein a weight ratio of the unsaturated polyamide to the initiator is about 90:10 to about 99:1; Element 13: the method further comprising: wet blending the unsaturated polyamide particles with an initiator, wherein a weight ratio of the unsaturated polyamide to the initiator is about 90:10 to about 99; Element 14: wherein the initiator is a photoinitiator; Element 15: wherein the initiator is a thermal initiator; Element 16: wherein the mixture further comprises a thermoplastic polymer that is not the unsaturated polyamide; Element 17: wherein the mixture further comprises an infrared absorber; Element 18: wherein the emulsion stabilizer is included in the mixture, and wherein the emulsion stabilizer associated with an outer surface of the unsaturated polyamide particles; Element 19: Element 18 and wherein the emulsion stabilizer comprises nanoparticles, and wherein the nanoparticles are embedded in the outer surface of the unsaturated polyamide particles; and Element 20: wherein the mixture further comprises an initiator, wherein a weight ratio of the initiator to the unsaturated polyamide is about 90:10 to about 99:1. Examples of combinations include, but are not limited to, two or more of Elements 12, 13, and 20 in combination; Element 1 in combination with one or more of Elements 9-20; Element 9 in combination with one or more of Elements 10-20; Element 10 in combination with one or more of Elements 11-20; Element 11 in combination with one or more of Elements 12-20; Element 12 in combination with one or more of Elements 13-20; Element 13 in combination with one or more of Elements 14-20; Element 14 in combination with one or more of Elements 15-20; Element 15 in combination with one or more of Elements 16-20; Element 16 in combination with one or more of Elements 17-20; and two or more of Elements 18-20 in combination.

A fourth nonlimiting example embodiment is a method comprising: emulsion polymerizing via a polycondensation and/or ring-opening reaction between a first polyamide monomer and a second polyamide monomer, wherein the second polyamide monomer comprises at least one unsaturated, aliphatic carbon-carbon bond to produce an unsaturated polyamide; precipitating the unsaturated polyamide as particles; and blending an initiator with the particles comprising the unsaturated polyamide. The fourth nonlimiting example embodiment may include one or more of: Element 21: wherein blending comprises dry blending; Element 22: wherein blending comprises wet blending; Element 23: wherein the initiator is a photoinitiator; Element 24: wherein the initiator is a thermal initiator; and Element 25: the method further comprising: blending an infrared absorber with the particles comprising the unsaturated polyamide.

A fifth nonlimiting example embodiment is a method comprising: dissolving an unsaturated polyamide in a solvent; precipitating the unsaturated polyamide as particles; and blending an initiator with the particles comprising the unsaturated polyamide. The fifth nonlimiting example embodiment may include one or more of: Element 26: wherein blending comprises dry blending; Element 27: wherein blending comprises wet blending; Element 28: wherein the initiator is a photoinitiator; Element 29: wherein the initiator is a thermal initiator; and Element 30: the method further comprising: blending an infrared absorber with the particles comprising the unsaturated polyamide.

A sixth nonlimiting example embodiment is a method comprising: dissolving an unsaturated polyamide in a solvent; precipitating the unsaturated polyamide as particles; and blending an initiator with the particles comprising the unsaturated polyamide. The sixth nonlimiting example embodiment may include one or more of: Element 31: wherein blending comprises dry blending; Element 32: wherein blending comprises wet blending; Element 33: wherein the initiator is a photoinitiator; Element 34: wherein the initiator is a thermal initiator; and Element 35: the method further comprising: blending an infrared absorber with the particles comprising the unsaturated polyamide.

A seventh nonlimiting example embodiment is a method comprising: dissolving an unsaturated polyamide and an initiator in a solvent; and precipitating the unsaturated polyamide to yield particles comprising the unsaturated polyamide and the initiator. The seventh nonlimiting example embodiment may include one or more of: Element 36: further comprising: dry blending another initiator (same or different than the initiator) with the particles comprising the unsaturated polyamide and the initiator; Element 37: further comprising: wet blending another initiator (same or different than the initiator) with the particles comprising the unsaturated polyamide and the initiator; Element 38: wherein the initiator is a photoinitiator; Element 39: wherein the initiator is a thermal initiator; and Element 40: the method further comprising: blending an infrared absorber with the particles comprising the unsaturated polyamide and the initiator.

An eighth nonlimiting example embodiment is a method comprising: cryogenically cooling an unsaturated polyamide; milling the cryogenically cooled unsaturated polyamide to yield particles; and blending an initiator with the particles comprising the unsaturated polyamide. The sixth nonlimiting example embodiment may include one or more of: Element 41: wherein blending comprises dry blending; Element 42: wherein blending comprises wet blending; Element 43: wherein the initiator is a photoinitiator; Element 44: wherein the initiator is a thermal initiator; and Element 45: the method further comprising: blending an infrared absorber with the particles comprising the unsaturated polyamide.

A ninth nonlimiting example embodiment is a method comprising: cryogenically cooling an unsaturated polyamide in the presence of an initiator; and milling the cryogenically cooled unsaturated polyamide to yield particles comprising the unsaturated polyamide and the initiator. The ninth nonlimiting example embodiment may include one or more of: Element 46: further comprising: dry blending another initiator (same or different than the initiator) with the particles comprising the unsaturated polyamide and the initiator; Element 47: further comprising: wet blending another initiator (same or different than the initiator) with the particles comprising the unsaturated polyamide and the initiator; Element 48: wherein the initiator is a photoinitiator; Element 49: wherein the initiator is a thermal initiator; and Element 50: the method further comprising: blending an infrared absorber with the particles comprising the unsaturated polyamide and the initiator.

A tenth nonlimiting example embodiment is a method comprising: melt emulsifying an unsaturated polyamide; cooling the melt emulsion to yield particles; and blending an initiator with the particles comprising the unsaturated polyamide. The tenth nonlimiting example embodiment may include one or more of: Element 51: wherein blending comprises dry blending; Element 52: wherein blending comprises wet blending; Element 53: wherein the initiator is a photoinitiator; Element 54: wherein the initiator is a thermal initiator; and Element 55: the method further comprising: blending an infrared absorber with the particles comprising the unsaturated polyamide.

An eleventh nonlimiting example embodiment is a method comprising: melt emulsifying an unsaturated polyamide in the presence of an initiator; and cooling the melt emulsion to yield particles comprising the unsaturated polyamide and the initiator. The eleventh nonlimiting example embodiment may include one or more of: Element 56: further comprising: dry blending another initiator (same or different than the initiator) with the particles comprising the unsaturated polyamide and the initiator; Element 57: further comprising: wet blending another initiator (same or different than the initiator) with the particles comprising the unsaturated polyamide and the initiator; Element 58: wherein the initiator is a photoinitiator; Element 59: wherein the initiator is a thermal initiator; and Element 60: the method further comprising: blending an infrared absorber with the particles comprising the unsaturated polyamide and the initiator.

Additional nonlimiting example embodiments are methods comprising: depositing the composition prepared according to one or more of the fourth through eleventh nonlimiting example embodiments optionally in combination with other thermoplastic polymer particles upon a surface; and once deposited, heating at least a portion of the particles to promote consolidation thereof and crosslinking of the unsaturated polyamide, thereby forming a consolidated body comprising a crosslinked polyamide.

CLAUSES

Clause 1. A composition comprising: particles comprising an unsaturated polyamide and an initiator.

Clause 2. The composition of Clause 1, wherein the particles have a circularity of about 0.9 to about 1.0.

Clause 3. The composition of Clause 1, wherein a weight ratio of the unsaturated polyamide to the initiator is about 90:10 to about 99:1.

Clause 4. The composition of Clause 1, wherein the particles further comprise an infrared absorber.

Clause 5. The composition of Clause 1 further comprising: an infrared absorber admixed with the particles.

Clause 6. The composition of Clause 1, wherein the particles further comprise a thermoplastic polymer that is not the unsaturated polyamide.

Clause 7. The composition of Clause 1, wherein the particles further comprise an emulsion stabilizer associated with an outer surface of the particles.

Clause 8. The composition of Clause 7, wherein at least some of the particles have a void comprising the emulsion stabilizer at a void/polymer interface.

Clause 9. The composition of Clause 7, wherein the emulsion stabilizer comprises nanoparticles, and wherein the nanoparticles are embedded in the outer surface of the particles.

Clause 10. A method comprising: depositing the composition of Clause 1 optionally in combination with other thermoplastic polymer particles upon a surface; and once deposited, heating at least a portion of the particles to promote consolidation thereof and crosslinking of the unsaturated polyamide, thereby forming a consolidated body comprising a crosslinked polyamide.

Clause 11. A method comprising: mixing a mixture comprising an unsaturated polyamide, a carrier fluid that is immiscible with the unsaturated polyamide, and optionally an emulsion stabilizer at a temperature greater than a melting point or softening temperature of the unsaturated polyamide and at a shear rate sufficiently high to disperse the unsaturated polyamide in the carrier fluid; and cooling the mixture to below the melting point or softening temperature of the unsaturated polyamide to form unsaturated polyamide particles comprising the unsaturated polyamide and the emulsion stabilizer, when present, associated with an outer surface of the unsaturated polyamide particles.

Clause 12. The method of Clause 11 further comprising: dry blending the unsaturated polyamide particles with an initiator, wherein a weight ratio of the unsaturated polyamide to the initiator is about 90:10 to about 99:1

Clause 13. The method of Clause 11 further comprising: wet blending the unsaturated polyamide particles with an initiator, wherein a weight ratio of the unsaturated polyamide to the initiator is about 90:10 to about 99:1.

Clause 14. The method of Clause 11, wherein the initiator is a photoinitiator.

Clause 15. The method of Clause 11, wherein the initiator is a thermal initiator.

Clause 16. The method of Clause 11, wherein the mixture further comprises a thermoplastic polymer that is not the unsaturated polyamide.

Clause 17. The method of Clause 11, wherein the mixture further comprises an infrared absorber.

Clause 18. The method of Clause 11, wherein the emulsion stabilizer is included in the mixture, and wherein the emulsion stabilizer associated with an outer surface of the unsaturated polyamide particles.

Clause 19. The method of Clause 18, wherein the emulsion stabilizer comprises nanoparticles, and wherein the nanoparticles are embedded in the outer surface of the unsaturated polyamide particles.

Clause 20. The method of Clause 11, wherein the mixture further comprises an initiator, wherein a weight ratio of the initiator to the unsaturated polyamide is about 90:10 to about 99:1.

Clause 21. A method comprising: emulsion polymerizing via a polycondensation and/or ring-opening reaction between a first polyamide monomer and a second polyamide monomer, wherein the second polyamide monomer comprises at least one unsaturated, aliphatic carbon-carbon bond to produce an unsaturated polyamide; precipitating the unsaturated polyamide as particles; and blending an initiator with the particles comprising the unsaturated polyamide.

Clause 22. The method of Clause 21, wherein blending comprises dry blending.

Clause 23. The method of Clause 21, wherein blending comprises wet blending.

Clause 24. The method of Clause 21, wherein the initiator is a photoinitiator.

Clause 25. The method of Clause 21, wherein the initiator is a thermal initiator.

Clause 26. The method of Clause 21 further comprising: blending an infrared absorber with the particles comprising the unsaturated polyamide.

Clause 27. A method comprising: dissolving an unsaturated polyamide in a solvent; precipitating the unsaturated polyamide as particles; and blending an initiator with the particles comprising the unsaturated polyamide.

Clause 28. The method of Clause 27, wherein blending comprises dry blending.

Clause 29. The method of Clause 27, wherein blending comprises wet blending.

Clause 30. The method of Clause 27, wherein the initiator is a photoinitiator.

Clause 31. The method of Clause 27, wherein the initiator is a thermal initiator.

Clause 32. The method of Clause 27 further comprising: blending an infrared absorber with the particles comprising the unsaturated polyamide.

Clause 33. A method comprising:
dissolving an unsaturated polyamide and an initiator in a solvent; and
precipitating the unsaturated polyamide to yield particles comprising the unsaturated polyamide and the initiator.

Clause 34. The method of Clause 33 further comprising dry blending a second initiator with the particles comprising the unsaturated polyamide and the initiator.

Clause 35. The method of Clause 33 further comprising wet blending a second initiator with the particles comprising the unsaturated polyamide and the initiator.

Clause 36. The method of Clause 33, wherein the initiator is a photoinitiator.

Clause 37. The method of Clause 33, wherein the initiator is a thermal initiator.

Clause 38. The method of Clause 33 further comprising: blending an infrared absorber with the particles comprising the unsaturated polyamide and the initiator.

Clause 39. A method comprising: cryogenically cooling an unsaturated polyamide; milling the cryogenically cooled unsaturated polyamide to yield particles; and blending an initiator with the particles comprising the unsaturated polyamide.

Clause 40. The method of Clause 39, wherein blending comprises dry blending.

Clause 41. The method of Clause 39, wherein blending comprises wet blending.

Clause 42. The method of Clause 39, wherein the initiator is a photoinitiator.

Clause 43. The method of Clause 39, wherein the initiator is a thermal initiator.

Clause 44. The method of Clause 39 further comprising: blending an infrared absorber with the particles comprising the unsaturated polyamide.

Clause 45. A method comprising: cryogenically cooling an unsaturated polyamide in the presence of an initiator; and milling the cryogenically cooled unsaturated polyamide to yield particles comprising the unsaturated polyamide and the initiator.

Clause 46. The method of Clause 45 further comprising dry blending a second initiator with the particles comprising the unsaturated polyamide and the initiator.

Clause 47. The method of Clause 45 further comprising wet blending a second initiator with the particles comprising the unsaturated polyamide and the initiator.

Clause 48. The method of Clause 45, wherein the initiator is a photoinitiator.

Clause 49. The method of Clause 45, wherein the initiator is a thermal initiator.

Clause 50. The method of Clause 45 further comprising: blending an infrared absorber with the particles comprising the unsaturated polyamide and the initiator.

Clause 51. A method comprising: melt emulsifying an unsaturated polyamide; cooling the melt emulsion to yield particles; and blending an initiator with the particles comprising the unsaturated polyamide.

Clause 52. The method of Clause 51, wherein blending comprises dry blending.

Clause 53. The method of Clause 51, wherein blending comprises wet blending.

Clause 54. The method of Clause 51, wherein the initiator is a photoinitiator.

Clause 55. The method of Clause 51, wherein the initiator is a thermal initiator.

Clause 56. The method of Clause 51 further comprising: blending an infrared absorber with the particles comprising the unsaturated polyamide.

Clause 57. A method comprising: melt emulsifying an unsaturated polyamide in the presence of an initiator; and cooling the melt emulsion to yield particles comprising the unsaturated polyamide and the initiator.

Clause 28. The method of Clause 57 further comprising dry blending a second initiator with the particles comprising the unsaturated polyamide and the initiator.

Clause 59. The method of Clause 57 further comprising wet blending a second initiator with the particles comprising the unsaturated polyamide and the initiator.

Clause 60. The method of Clause 57, wherein the initiator is a photoinitiator.

Clause 61. The method of Clause 57, wherein the initiator is a thermal initiator.

Clause 62. The method of Clause 57 further comprising: blending an infrared absorber with the particles comprising the unsaturated polyamide and the initiator.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Prophetic Example 1. Synthesis of unsaturated polyamides via interfacial polycondensation is described. The interfacial polycondensation may be carried out in a 2 L glass vessel with an overhead stirrer at a constant rate of 2000 RPM. A 500 mL solution of fumaryl dichloride in toluene at a concentration of 0.2 molar (M) may be added to the stirring vessel containing 500 mL of a 0.2 M aqueous suspension of 4,4'-methylenedianiline (MDA). The aqueous suspension of MDA may be spiked with KOH in the form of a 0.5 normality (N) solution added to the aqueous phase at the rate of 1 mole of KOH per mole of MDA to ensure maximum molecular weight of the polyamide. After allowing the solutions to mix for 30 minutes at 20° C.±2° C., a thick solution should form. After the toluene is distilled off via rotary evaporation under pressure or steam, the polymer should be in the form of a thin film. This film may be ground up and washed with a copious amount of water until no chlorine is detected in the effluent water. The polymer may be further washed free of residual monomers with hot 30% methanol and then dried in a vacuum oven. The melting point of the resultant polymer (Polymer A) should be approximately 230° C.

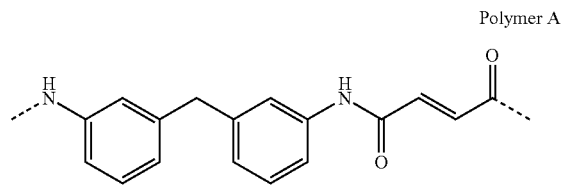

Polymer A

Prophetic Example 2. Synthesis of unsaturated polyamides from dicarboxylic acid is described where aliphatic and aromatic dicarboxylic acids may be directly reacted with 1,5-bis(3-aminophenyl)-1,4-pentadiene-3-one (DADBA). These monomers may be reacted in a polar solvent in the presence of thionyl chloride at a low temperature (e.g., about 10° C. or less). An example synthesis procedure may occur in a 2 L glass kettle fitted with an overhead stirrer, thermocouple, and nitrogen purge where 21.9 g (150 mmol) of adipic acid in 300 mL of dimethylformamide (DMF) are added. This mixture may then be cooled to −5° C. with a NaNO₃/ice bath while 35.7 g (300 mmol) of thionyl chloride is added with stirring. After about 1 to 2 minutes 39.6 g (150 mmol) of DADBA and 30.3 g (300 mmol) of triethyl amine (TEA) may be added to the mixture and stirred for 10 hours at 0° C. to 5° C. After the reaction is complete, the polymer solution may be poured into an ice water bath and filtered immediately. The polymer may then be washed several times with cold water and ethanol. For further purification to remove additional DMF solution, methanol may be used as the non-solvent. The melting point of the resultant polymer (Polymer B) should be approximately 220° C.

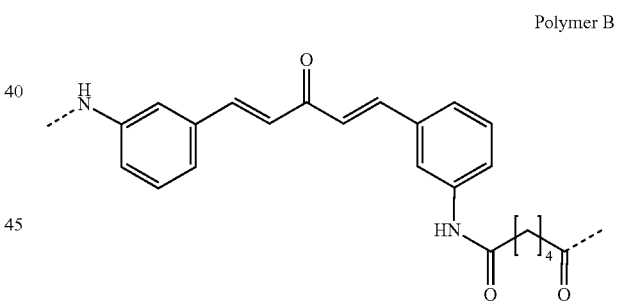

Polymer B

Prophetic Example 3. Unsaturated polyamides may also be produced via low temperature polymerization by reacting diacid chlorides of aliphatic and aromatic dicarboxylic acids directly with DADBA. An example synthesis procedure may occur in a glass kettle fitted with an overhead stirrer, thermocouple, and nitrogen purge in which 27.3 g (150 mmol) of adipoyl chloride in 300 mL of N-methyl pyrrolidone (NMP) are added. This mixture may then be cooled to −5° C. with a NaNO₃/ice bath while 39.6 g (150 mmol) of DADBA and 30.3 g (300 mmol) of triethyl amine (TEA) are added to the mixture and stirred for 10 hours at 0° C. to 5° C. After the reaction is complete, the polymer solution may be poured into an ice water bath and filtered immediately. The polymer may then be washed with ethanol and chloroform. The final purification step may include dissolving the polymer in DMF followed by precipitation in methanol. The melting point of the resultant polymer (Polymer B) should be approximately 220° C.

Prophetic Example 4. Microparticles may be produced from the unsaturated polyamides synthesized in Prophetic Examples 1-3 in a Haake small-scale double screw extruder with high shear rotors. The carrier fluid may be a carrier fluid described herein (e.g., PDMS oil having about 10,000 cSt to about 30,000 cSt viscosity at room temperature). The carrier fluid having 1 wt % AEROSIL® R812S silica nanoparticles (relative to polymer) dispersed therein may be added first and brought to a temperature around the melting point of the polymer. Then, room temperature polymer pellets of unsaturated polyamide and initiator (preferably an initiator, if thermally triggered, with an activation energy above the melt emulsification temperature) may be added to the heated carrier fluid in the extruder. The weight ratio of carrier fluid to polyamide may be about 60:40 to about 80:20. The weight ratio of polyamide to initiator may be about 90:10 to about 99:1. At temperature, the extruder may be operated at about 200 rpm for about 20 minutes to about 30 minutes. Then, the mixture may be discharged from the extruder onto a cold surface to provide rapid quench cooling. The oil may be washed away from the unsaturated polyamide microparticles using ethyl acetate and filtered from the oil/ethyl acetate mixture. The washing procedure may include three washes of about 200 mL to about 500 mL of ethyl acetate at room temperature. The particles may be separated from the solvent by vacuum filtration onto Whatman #1 90 mm filter paper. The microparticles may then be air dried overnight in an aluminum pan in the fume hood to allow any residual ethyl acetate to evaporate. The final unsaturated polyamide particles should have a D50 of about 30 microns to about 70 microns and a span of about 0.9 to about 1.3.

Prophetic Example 5. Microparticles may be produced from the unsaturated polyamides synthesized in Prophetic Examples 1-3 in a Haake small-scale double screw extruder with high shear rotors. The carrier fluid may be a carrier fluid described herein (e.g., PDMS oil having about 10,000 cSt to about 30,000 cSt viscosity at room temperature). To mitigate premature crosslinking of the polymer during melt emulsification, the carrier fluid having 1 wt % AEROSIL® R812S silica nanoparticles (relative to polymer) dispersed therein may be added first and brought to a temperature around the melting point of the polymer. Then, room temperature polymer pellets of unsaturated polyamide may be added to the heated carrier fluid in the extruder. The weight ratio of carrier fluid to polyamide may be about 60:40 to about 80:20. At temperature, the extruder may be operated at about 200 rpm for about 20 minutes to about 30 minutes. Then, the mixture may be discharged from the extruder onto a cold surface to provide rapid quench cooling. The oil may be washed away from the unsaturated polyamide microparticles using ethyl acetate and filtered from the oil/ethyl acetate mixture. The washing procedure may include three washes of about 200 mL to about 500 mL of ethyl acetate at room temperature. The particles may be separated from the solvent by vacuum filtration onto Whatman #1 90 mm filter paper. The microparticles may then be air dried overnight in an aluminum pan in the fume hood to allow any residual ethyl acetate to evaporate. The final unsaturated polyamide particles should have a D50 of about 30 microns to about 70 microns and a span of about 0.9 to about 1.3.

The resultant unsaturated polyamide particles may then be dry blended with an initiator. The weight ratio of polyamide to initiator may be about 90:10 to about 99:1.

Prophetic Example 6. Microparticles may be produced from the unsaturated polyamides synthesized in Prophetic Examples 1-3 in a Haake small-scale double screw extruder with high shear rotors. The carrier fluid may be a carrier fluid described herein (e.g., PDMS oil having about 10,000 cSt to about 30,000 cSt viscosity at room temperature). To mitigate premature crosslinking of the polymer during melt emulsification, the carrier fluid having 1 wt % AEROSIL® R812S silica nanoparticles (relative to polymer) dispersed therein may be added first and brought to a temperature around the melting point of the polymer. Then, room temperature polymer pellets of unsaturated polyamide may be added to the heated carrier fluid in the extruder. The weight ratio of carrier fluid to polyamide may be about 60:40 to about 80:20. At temperature, the extruder may be operated at about 200 rpm for about 20 minutes to about 30 minutes. Then, the mixture may be discharged from the extruder onto a cold surface to provide rapid quench cooling. The oil may be washed away from the unsaturated polyamide microparticles using ethyl acetate and filtered from the oil/ethyl acetate mixture. The washing procedure may include three washes of about 200 mL to about 500 mL of ethyl acetate at room temperature. The particles may be separated from the solvent by vacuum filtration onto Whatman #1 90 mm filter paper. The microparticles may then be air dried overnight in an aluminum pan in the fume hood to allow any residual ethyl acetate to evaporate. The final unsaturated polyamide particles should have a D50 of about 30 microns to about 70 microns and a span of about 0.9 to about 1.3.

The resultant unsaturated polyamide particles may then be dispersed in methanol with a solids loading of about 15 wt % to about 30 wt %. The weight ratio of polyamide to initiator may be about 90:10 to about 99:1. Once the particles are wetted, an about 1 wt % to about 10 wt % dispersion of initiator in methanol may be added into the particle slurry. The mixing may continue at ambient temperature± about 10° C. When heated, the temperature should not be high enough to initiate crosslinking. After about 30 minutes to about 3 hours of mixing, the particles may be filtered and dried in a vacuum oven overnight.

Prophetic Example 7. Unsaturated polyamide particles doped with an initiator from Prophetic Examples 4-6 may be used in SLS to form a consolidated structure. For example, as a $CO_2$ laser passes over the powder bed during the sintering step of the printing process, there may be a slight penetration through the particles' top layer resulting in crosslinking reactions of the unsaturated bonds. These bonds may also inter-crosslink within the previously printed layer improving the degree of curing and ultimately the final properties of the printed part. The laser speed may be reduced to ensure sufficient heat penetration and provide for enhanced crosslinking between the printed layers. As the layers are scanned with the laser, the layer below the newly added layer may remain partially molten and also partially crosslinked until the next layer of powder is spread over top. The new layer may be heated and further melt the powder enabling particles of the new layer to chemically react with other particles in the vicinity.

Prophetic Example 8. The preparation of the unsaturated lactam monomer, 1-aza-4-cyclooctene or 1-aza-2-ketocyclooct-5-ene, may be followed from S. R. Wilson, R. A. Sawicki, J. Org. Chem. 44 (1979) 287-291. The synthesis of the amine requires a series of reactions, first the oxime of 4-cycloheptenone may be produced, followed by treatment with p-toluenesulfonyl chloride and pyridine to yield the tosylate form. The tosyl oxime may undergo a Beckmann rearrangement to give the lactam form, a white crystalline material.

The ring opening polymerization may be performed in a flask under nitrogen where the 1-aza-4-cyclooctene (125.17 g, 1 mol) and a second generation Grubbs' catalyst (0.59 g, 10 mmol) such as the [RuCl$_2$(p-cymene)]$_2$/PCy3 are added first followed by dry chlorobenzene (1 L). The mixture may be stirred for 5 minutes at 60° C., then 300 ml of trimethylsilyldiazomethane (TMSD, 0.1M in chlorobenzene, 3×10$^{-2}$ mmol) may be added via a syringe pump. The TMSD is needed in situ to generate a highly reactive coordinated unsaturated ruthenium-carbene species that activates the catalytic process$^R$. The solution may be stirred for 24 hours at 60° C. The conversion may be monitored by gas chromatography (GC). The mixture may then be cooled to ambient temperature and poured into a large volume of n-heptane. The precipitated polymer may then be dried overnight under vacuum.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
    depositing particles comprising i) an unsaturated polyamide, ii) an initiator, and iii) an infrared absorber that absorbs electromagnetic radiation from 100 nm to 1 mm upon a surface;
        wherein an emulsion stabilizer coating consisting of nanoparticles is disposed upon an outer surface of the particles; and
        wherein the particles have a circularity of about 0.9 to about 1.0, and the unsaturated polyamide comprises at least one of:
            i) a polycondensation reaction product of at least one amino acid monomer having an unsaturated, aliphatic carbon-carbon bond; ii) a polycondensation reaction product of an amino acid monomer having an unsaturated, aliphatic carbon-carbon bond and an amino acid monomer lacking an unsaturated, aliphatic carbon-carbon bond; iii) a polycondensation reaction product of an amino acid monomer and a polyamine monomer, at least one of the amino acid monomer and the polyamine monomer having an unsaturated, aliphatic carbon-carbon bond; iv) a polycondensation reaction product of an amino acid monomer and a polyacid monomer, at least one of the amino acid monomer and the polyacid monomer having an unsaturated, aliphatic carbon-carbon bond; v) a polycondensation reaction product of an amino acid monomer, a polyamine monomer, and a polyacid monomer, at least one of the amino acid monomer, the polyamine monomer, and the polyacid monomer having an unsaturated, aliphatic carbon-carbon bond; vi) a ring-opening reaction product of a cyclic amide monomer and an amino acid monomer having an unsaturated, aliphatic carbon-carbon bond; vii) a ring-opening reaction product of a cyclic amide monomer and a polyacid monomer having an unsaturated, aliphatic carbon-carbon bond; viii) a ring-opening reaction product of a cyclic amide monomer and a polyamine monomer having an unsaturated, aliphatic carbon-carbon bond; and ix) a ring-opening reaction product of a cyclic amide monomer, a polyamine monomer, and a polyacid monomer, at least one of the polyamine monomer and the polyacid monomer having an unsaturated, aliphatic carbon-carbon bond; and
    once deposited, heating at least a portion of the particles to promote consolidation thereof and crosslinking of the unsaturated polyamide thereof, thereby forming a consolidated body comprising a crosslinked polyamide.

2. The method of claim 1, wherein a weight ratio of the unsaturated polyamide to the initiator is about 90:10 to about 99:1.

3. The method of claim 1, wherein the particles further comprise a thermoplastic polymer that is not the unsaturated polyamide.

4. The method of claim 1, wherein at least some of the particles have a void comprising the nanoparticles at a void/polymer interface.

5. The method of claim 1, wherein the nanoparticles are embedded in the outer surface of the particles.

6. The method of claim 1, wherein the particles have a D10 of about 0.1 μm to about 125 μm, a D50 of about 0.5 μm to about 200 μm, and a D90 of about 3 μm to about 300 μm, wherein D10<D50<D90.

7. The method of claim 1, wherein the unsaturated polyamide has a melting point or softening temperature of 200° C. or greater.

8. A composition comprising:
    particles comprising i) an unsaturated polyamide, ii) an initiator, and iii) an infrared absorber that absorbs electromagnetic radiation from 100 nm to 1 mm;
        wherein an emulsion stabilizer coating consisting of nanoparticles is disposed upon an outer surface of the particles;
        wherein the unsaturated polyamide comprises at least one of:
            i) a polycondensation reaction product of at least one amino acid monomer having an unsaturated, aliphatic carbon-carbon bond; ii) a polycondensation reaction product of an amino acid monomer having an unsaturated, aliphatic carbon-carbon bond and an amino acid monomer lacking an unsaturated, aliphatic carbon-carbon bond; iii) a polycondensation reaction product of an amino acid monomer and a polyamine monomer, at least one of the amino acid monomer and the polyamine monomer having an unsaturated, aliphatic carbon-carbon bond; iv) a polycondensation reaction product of an amino acid monomer and a polyacid monomer, at least one of the amino acid monomer and the polyacid monomer having an unsaturated, aliphatic carbon-carbon bond; v) a polycondensation reaction product of an amino acid monomer, a polyamine monomer, and a polyacid monomer, at least one of the amino acid monomer, the polyamine monomer, and the polyacid monomer having an unsaturated, aliphatic carbon-carbon bond; vi) a ring-opening reaction product of a cyclic amide monomer and an amino acid monomer having an unsaturated, aliphatic carbon-carbon bond; vii) a ring-opening reaction product of a cyclic amide monomer and a polyacid monomer having an unsaturated, aliphatic carbon-carbon bond; viii) a ring-opening reaction product of a cyclic amide monomer and a polyamine monomer having an unsaturated, aliphatic carbon-carbon bond; and ix) a ring-opening reaction product of a cyclic amide monomer, a polyamine monomer, and a polyacid monomer, at least one of the polyamine monomer and the polyacid monomer having an unsaturated, aliphatic carbon-carbon bond.

9. The composition of claim 8, wherein the particles have a D10 of about 0.1 μm to about 125 μm, a D50 of about 0.5 μm to about 200 μm, and a D90 of about 3 μm to about 300 μm, wherein D10<D50<D90.

10. The composition of claim 8, wherein the particles have a circularity of about 0.9 to about 1.0.

11. A method comprising:
  shearing a mixture comprising i) an unsaturated polyamide, ii) a carrier fluid that is immiscible with the unsaturated polyamide, iii) an infrared absorber that absorbs electromagnetic radiation from 100 nm to 1 mm, and iv) an emulsion stabilizer consisting of nanoparticles that is dispersible in the carrier fluid, optionally wherein at least a portion of the infrared absorber comprises the nanoparticles, at a temperature greater than a melting point or softening temperature of the unsaturated polyamide and at a shear rate sufficiently high to disperse the unsaturated polyamide in the carrier fluid as droplets and to dispose the nanoparticles at an interface between the droplets and the carrier fluid;
  wherein the unsaturated polyamide comprises at least one of:
    i) a polycondensation reaction product of at least one amino acid monomer having an unsaturated, aliphatic carbon-carbon bond; ii) a polycondensation reaction product of an amino acid monomer having an unsaturated, aliphatic carbon-carbon bond and an amino acid monomer lacking an unsaturated, aliphatic carbon-carbon bond; iii) a polycondensation reaction product of an amino acid monomer and a polyamine monomer, at least one of the amino acid monomer and the polyamine monomer having an unsaturated, aliphatic carbon-carbon bond; iv) a polycondensation reaction product of an amino acid monomer and a polyacid monomer, at least one of the amino acid monomer and the polyacid monomer having an unsaturated, aliphatic carbon-carbon bond; v) a polycondensation reaction product of an amino acid monomer, a polyamine monomer, and a polyacid monomer, at least one of the amino acid monomer, the polyamine monomer, and the polyacid monomer having an unsaturated, aliphatic carbon-carbon bond; vi) a ring-opening reaction product of a cyclic amide monomer and an amino acid monomer having an unsaturated, aliphatic carbon-carbon bond; vii) a ring-opening reaction product of a cyclic amide monomer and a polyacid monomer having an unsaturated, aliphatic carbon-carbon bond; viii) a ring-opening reaction product of a cyclic amide monomer and a polyamine monomer having an unsaturated, aliphatic carbon-carbon bond; and ix) a ring-opening reaction product of a cyclic amide monomer, a polyamine monomer, and a polyacid monomer, at least one of the polyamine monomer and the polyacid monomer having an unsaturated, aliphatic carbon-carbon bond; and
  cooling the mixture to below the melting point or softening temperature of the unsaturated polyamide to form particles comprising the unsaturated polyamide and the infrared absorber;
    wherein an emulsion stabilizer coating consisting of the nanoparticles is disposed upon an outer surface of the particles.

12. The method of claim 11, further comprising:
  dry blending the particles with an initiator, wherein a weight ratio of the unsaturated polyamide to the initiator is about 90:10 to about 99:1.

13. The method of claim 11 further comprising:
  wet blending the particles with an initiator, wherein a weight ratio of the unsaturated polyamide to the initiator is about 90:10 to about 99:1.

14. The method of claim 13, wherein the initiator is a photoinitiator.

15. The method of claim 13, wherein the initiator is a thermal initiator.

16. The method of claim 11, wherein the mixture further comprises a thermoplastic polymer that is not the unsaturated polyamide.

17. The method of claim 11, wherein the nanoparticles are embedded in the outer surface of the particles.

18. The method of claim 11, wherein the mixture further comprises an initiator, and a weight ratio of the initiator to the unsaturated polyamide is about 90:10 to about 99:1.

19. The method of claim 11, wherein the particles have a D10 of about 0.1 μm to about 125 μm, a D50 of about 0.5 μm to about 200 μm, and a D90 of about 3 μm to about 300 μm, wherein D10<D50<D90.

20. The method of claim 11, wherein the particles have a circularity of about 0.9 to about 1.0.

* * * * *